(12) United States Patent
Melzer

(10) Patent No.: US 11,720,878 B2
(45) Date of Patent: *Aug. 8, 2023

(54) COMPUTERIZED AGENT EXTERNAL TO AN INSTANT MESSAGING (IM) SERVICE FOR ENHANCING AN IM SESSION MANAGED BY THE IM SERVICE

(71) Applicant: Roy S. Melzer, Tel-Aviv (IL)

(72) Inventor: Roy S. Melzer, Tel-Aviv (IL)

( * ) Notice: Subject to any disclaimer, the term of this patent is extended or adjusted under 35 U.S.C. 154(b) by 163 days.

This patent is subject to a terminal disclaimer.

(21) Appl. No.: 17/384,851

(22) Filed: Jul. 26, 2021

(65) Prior Publication Data

US 2021/0350355 A1 Nov. 11, 2021

Related U.S. Application Data

(63) Continuation of application No. 17/092,470, filed on Nov. 9, 2020, now Pat. No. 11,074,571, which is a
(Continued)

(51) Int. Cl.
*G06Q 20/32* (2012.01)
*G06Q 40/02* (2023.01)
(Continued)

(52) U.S. Cl.
CPC ......... *G06Q 20/3255* (2013.01); *G06Q 10/10* (2013.01); *G06Q 20/02* (2013.01);
(Continued)

(58) Field of Classification Search
CPC .. G06Q 20/10; G06Q 20/0855; G06Q 20/326; G06Q 20/40; G06Q 20/16;
(Continued)

(56) References Cited

U.S. PATENT DOCUMENTS 7,099,855 B1 8/2006 Nelken et al.
7,468,729 B1 12/2008 Levinson
(Continued)

FOREIGN PATENT DOCUMENTS

| WO | WO 2014/028647 | 2/2014 |
|---|---|---|
| WO | WO 2015/145430 | 10/2015 |
| WO | WO 2016/046824 | 3/2016 |

OTHER PUBLICATIONS

Advisory Action Before the Filing of An Appeal Brief dated Jun. 5, 2018 From the US Patent and Trademark Office Re. U.S. Appl. No. 15/272,642. (3 pages).
(Continued)

*Primary Examiner* — Hitesh Patel

(57) ABSTRACT

A method of adding a computerized agent to an instant messaging (IM) session managed by an IM service for identifying automatically textual instructions to perform a transaction related to participant(s) of the IM session, comprising: using a computerized agent subscribed to an IM service by a telephone number and participates in an IM session managed by an IM service to acquire text content in an IM session and analyzing at least the text content of the IM session to identify automatically textual instructions to perform a transaction from the user which uses the IM client module, automatically instructing an operation of the transaction and submitting by the computerized agent at least one IM message in the IM session.

13 Claims, 15 Drawing Sheets

Related U.S. Application Data continuation of application No. 16/865,551, filed on May 4, 2020, now Pat. No. 10,832,236, which is a continuation of application No. 15/272,642, filed on Sep. 22, 2016, now Pat. No. 10,643,197, which is a continuation of application No. PCT/IL2015/050302, filed on Mar. 23, 2015.

(60) Provisional application No. 62/092,344, filed on Dec. 16, 2014, provisional application No. 62/053,248, filed on Sep. 22, 2014, provisional application No. 61/969,189, filed on Mar. 23, 2014.

(51) Int. Cl.

| | |
|---|---|
| *G06Q 20/02* | (2012.01) |
| *G06Q 10/10* | (2023.01) |
| *G06Q 20/22* | (2012.01) |
| *H04L 51/046* | (2022.01) |
| *H04L 65/403* | (2022.01) |
| *H04L 67/02* | (2022.01) |

(52) U.S. Cl.
CPC ........... *G06Q 20/223* (2013.01); *G06Q 40/02* (2013.01); *H04L 51/046* (2013.01); *H04L 65/403* (2013.01); *H04L 67/02* (2013.01)

(58) Field of Classification Search
CPC .. G06Q 20/108; G06Q 30/0601; G06Q 20/38; G06Q 20/027; H04L 51/046; H04L 51/52; H04L 67/02; H04L 51/04
See application file for complete search history.

(56) References Cited

U.S. PATENT DOCUMENTS

| | | | |
|---|---|---|---|
| 7,870,199 B2 | 1/2011 | Galli et al. | |
| 8,103,734 B2 | 1/2012 | Galli et al. | |
| 8,239,461 B2 | 8/2012 | Jones et al. | |
| 8,671,022 B2 | 3/2014 | Sinn et al. | |
| 8,850,472 B2 | 9/2014 | Sharan et al. | |
| 8,898,241 B2 | 11/2014 | Jones et al. | |
| 9,053,489 B2 | 6/2015 | Jablokov et al. | |
| 9,799,046 B2 | 10/2017 | Stoll et al. | |
| 9,830,634 B2 | 11/2017 | Garbow et al. | |
| 9,917,802 B2 | 3/2018 | Melzer et al. | |
| 10,643,197 B2 | 5/2020 | Melzer | |
| 10,748,181 B2 | 8/2020 | Melzer et al. | |
| 10,832,236 B2 | 11/2020 | Melzer | |
| 11,074,571 B2 | 7/2021 | Melzer | |
| 2002/0059098 A1 | 5/2002 | Sazawa et al. | |
| 2002/0178113 A1 | 11/2002 | Clifford et al. | |
| 2004/0162878 A1 | 8/2004 | Lewis et al. | |
| 2005/0086309 A1* | 4/2005 | Galli | G06Q 10/107 709/206 |
| 2006/0129455 A1 | 6/2006 | Shah | |
| 2006/0168054 A1 | 7/2006 | Burkhart et al. | |
| 2007/0083887 A1 | 4/2007 | Gutta et al. | |
| 2007/0219901 A1 | 9/2007 | Garbow et al. | |
| 2008/0147514 A1 | 1/2008 | Shuster et al. | |
| 2008/0177600 A1 | 7/2008 | McCarthy et al. | |
| 2009/0006333 A1 | 1/2009 | Jones et al. | |
| 2010/0161415 A1 | 6/2010 | Mandel | |
| 2010/0235235 A1 | 9/2010 | Hosseini et al. | |
| 2010/0257552 A1 | 10/2010 | Sharan et al. | |
| 2011/0078270 A1 | 3/2011 | Galli et al. | |
| 2011/0219293 A1 | 9/2011 | Maxwell et al. | |
| 2011/0296294 A1 | 12/2011 | Bhadury et al. | |
| 2011/0320273 A1 | 12/2011 | Miranda-Steiner | |
| 2012/0023119 A1 | 1/2012 | Ducatel et al. | |
| 2012/0215871 A1 | 8/2012 | Zhang | |
| 2012/0226561 A1 | 9/2012 | Sinn et al. | |
| 2012/0296887 A1 | 11/2012 | Jones et al. | |
| 2012/0303445 A1 | 11/2012 | Jablokov et al. | |
| 2013/0262309 A1 | 10/2013 | Gadotti | |
| 2013/0311324 A1 | 11/2013 | Stoll et al. | |
| 2014/0052633 A1* | 2/2014 | Gandhi | G06Q 40/02 705/44 |
| 2014/0058939 A1 | 2/2014 | Savla | |
| 2015/0088998 A1* | 3/2015 | Isensee | G06F 40/279 709/206 |
| 2015/0213512 A1 | 7/2015 | Spievak et al. | |
| 2015/0379562 A1 | 12/2015 | Spievak et al. | |
| 2016/0300202 A1 | 10/2016 | Xu et al. | |
| 2017/0011383 A1 | 1/2017 | Melzer | |
| 2017/0279747 A1 | 9/2017 | Melzer et al. | |
| 2017/0293937 A1 | 10/2017 | Gilliam | |
| 2018/0205679 A1 | 7/2018 | Melzer et al. | |
| 2020/0265413 A1 | 8/2020 | Melzer | |
| 2020/0380559 A1 | 12/2020 | Melzer et al. | |
| 2021/0056534 A1 | 2/2021 | Melzer | |
| 2022/0172246 A1 | 6/2022 | Melzer et al. | |

OTHER PUBLICATIONS

Advisory Action Before the Filing of An Appeal Brief dated Feb. 27, 2019 From the US Patent and Trademark Office Re. U.S. Appl. No. 15/272,642. (5 pages).
Advisory Action Before the Filing of An Appeal Brief dated Oct. 31, 2017 From the US Patent and Trademark Office Re. U.S. Appl. No. 15/272,642. (5 pages).
Applicant-Initiated Interview Summary dated Feb. 6, 2020 From the US Patent and Trademark Office Re. U.S. Appl. No. 15/919,427. (3 pages).
Applicant-Initiated Interview Summary dated Oct. 10, 2018 From the US Patent and Trademark Office Re. U.S. Appl. No. 15/272,642. (3 pages).
Applicant-Initiated Interview Summary dated Jul. 11, 2019 From the US Patent and Trademark Office Re. U.S. Appl. No. 15/272,642. (3 pages).
Applicant-Initiated Interview Summary dated Nov. 13, 2017 From the US Patent and Trademark Office Re. U.S. Appl. No. 15/511,021 (4 pages).
Applicant-Initiated Interview Summary dated Aug. 21, 2017 From the US Patent and Trademark Office Re. U.S. Appl. No. 15/272,642. (3 pages).
Applicant-Initiated Interview Summary dated Jan. 23, 2018 From the US Patent and Trademark Office Re. U.S. Appl. No. 15/272,642. (3 pages).
Applicant-Initiated Interview Summary dated Jun. 23, 2017 From the US Patent and Trademark Office Re. U.S. Appl. No. 15/272,642. (3 pages).
Applicant-Initiated Interview Summary dated Apr. 27, 2018 From the US Patent and Trademark Office Re. U.S. Appl. No. 15/272,642. (3 pages).
International Preliminary Report on Patentability dated Apr. 6, 2017 From the International Bureau of WIPO Re. Application No. PCT/IL2015/050965.
International Preliminary Report on Patentability dated Jul. 20, 2016 From the International Preliminary Examining Authority Re. Application No. PCT/IL2015/050302.
International Search Report and the Written Opinion dated Jan. 11, 2016 From the International Searching Authority Re. Application No. PCT/IL2015/050965.
International Search Report and the Written Opinion dated Jul. 13, 2015 From the International Searching Authority Re. Application No. PCT/IL2015/050302.
Notice of Allowance dated Jan. 2, 2020 From the US Patent and Trademark Office Re. U.S. Appl. No. 15/272,642. (13 pages).
Notice of Allowance dated Apr. 10, 2020 from the US Patent and Trademark Office Re. U.S. Appl. No. 15/919,427. (10 pages).
Notice of Allowance dated Sep. 11, 2020 from the US Patent and Trademark Office Re. U.S. Appl. No. 16/865,551. (24 pages).
Notice of Allowance dated Jan. 19, 2018 From the US Patent and Trademark Office Re. U.S. Appl. No. 15/511,021. (11 pages).
Notice of Allowance dated May 26, 2021 From the US Patent and Trademark Office Re. U.S. Appl. No. 17/092,470. (20 Pages).

(56) References Cited

OTHER PUBLICATIONS

Official Action dated Aug. 2, 2017 From the US Patent and Trademark Office Re. U.S. Appl. No. 15/272,642. (46 pages).
Official Action dated Apr. 3, 2019 From the US Patent and Trademark Office Re. U.S. Appl. No. 15/272,642. (39 pages).
Official Action dated Dec. 3, 2018 From the US Patent and Trademark Office Re. U.S. Appl. No. 15/272,642. (43 pages).
Official Action dated Mar. 16, 2018 From the US Patent and Trademark Office Re. U.S. Appl. No. 15/272,642. (48 pages).
Official Action dated May 17, 2017 From the US Patent and Trademark Office Re. U.S. Appl. No. 15/272,642. (37 pages).
Official Action dated Nov. 18, 2019 From the US Patent and Trademark Office Re. U.S. Appl. No. 15/919,427. (44 pages).
Official Action dated Dec. 22, 2017 From the US Patent and Trademark Office Re. U.S. Appl. No. 15/272,642. (56 pages).
Official Action dated Oct. 24, 2017 From the US Patent and Trademark Office Re. U.S. Appl. No. 15/511,021. (39 pages).
Official Action dated Jun. 27, 2018 From the US Patent and Trademark Office Re. U.S. Appl. No. 15/272,642. (44 pages).
Ex Parte Quayle Official Action Dated Sep. 15, 2021 From the US Patent and Trademark Office Re. U.S. Appl. No. 16/994,801. (17 Pages).
Notice of Allowance Dated Oct. 15, 2021 from US Patent and Trademark Office Re. U.S. Appl. No. 16/994,801. (8 pages).
Requisition by the Examiner Dated Oct. 20, 2021 From the Innovation, Science and Economic Development Canada, Canadian Intellectual Property Office Re. Application No. 2,999,230. (8 Pages).

* cited by examiner

FIG. 11A

COMPUTERIZED AGENT EXTERNAL TO AN INSTANT MESSAGING (IM) SERVICE FOR ENHANCING AN IM SESSION MANAGED BY THE IM SERVICE

RELATED APPLICATIONS

This application is a continuation of U.S. patent application Ser. No. 17/092,470 filed on Nov. 9, 2020, which is a is a continuation of U.S. patent application Ser. No. 16/865,551, filed on May 4, 2020, now U.S. Pat. No. 10,832,236, which is a continuation of U.S. patent application Ser. No. 15/272,642 filed on Sep. 22, 2016, now U.S. Pat. No. 10,643,197, which is a continuation of PCT Patent Application No. PCT/IL2015/050302 having International Filing Date of Mar. 23, 2015, which claims the benefit of priority under 35 USC § 119(e) of U.S. Provisional Patent Applications Nos. 61/969,189 filed on Mar. 23, 2014, 62/053,248 filed on Sep. 22, 2014 and 62/092,344 filed on Dec. 16, 2014. The contents of the above applications are all incorporated by reference as if fully set forth herein in their entirety.

FIELD AND BACKGROUND OF THE INVENTION

The present invention, in some embodiments thereof, relates to methods and systems of performed financial transactions and, more specifically, but not exclusively, to methods and systems of performing financial transactions in an instant messaging session.

Money transfer systems are well known. Many people use the services of money transfer service providers to send funds to other people or businesses. Electronic communication and banking networks now allow such transactions to have nearly global reach. For example, a sender can go to a bank, provide funds and have the funds transferred to a recipient in any location, such as, China, Mexico, Ghana, New York, etc. A recipient can go to a bank, provide proof of identity and receive funds provided by the sender.

SUMMARY OF THE INVENTION

According to some embodiments of the present invention, there is provided a method of performing a financial transaction. The method comprises adding a computerized agent representing a transaction performing entity as a participant to an instant messaging (IM) session managed by an IM service, the computerized agent being subscribed to the IM service by a telephone number, the adding is instructed by a user using an IM client module, the IM client module running on a client terminal and used to allow the user to participate in the IM session by inputting text content, analyzing the IM session to identify automatically instructions to perform a financial transaction from the user which uses the IM client module, automatically instructing an operation of the financial transaction, and receiving from the computerized agent an IM message in the IM session which is indicative of a performance or a denial of the financial transaction by the transaction performing entity and presenting the IM message to the user.

Optionally, the analyzing the IM session is performed by natural language processing (NLP) of a plurality of messages documented in the IM session.

Optionally, at least one participant of the IM session is a beneficiary of the financial transaction, the instructions are indicative of transferring funds from a bank or a credit account of the user to the at least one participant during the performance of the financial transaction.

More optionally, the IM session is a group discussion between the user, the transaction performing entity agent, and the at least one participant.

More optionally, the analyzing comprises extracting from the IM session details of the at least one participant to perform the financial transaction.

More optionally, the at least one participant are added to the IM session by the user.

More optionally, the at least one participant are added to the IM session by the user.

More optionally, the method further comprises establishing an additional IM session between the computerized agent and the at least one participant to acquire payment data; wherein the operation is performed using the payment data.

Optionally, the method further comprises establishing an additional IM session between the computerized agent and the user to authenticate the user; wherein the operation is performed when the user is authenticated.

Optionally, the method further comprises performing at least one of instructing the IM service to delete or mask at least some of the additional IM session and sending the user a reminder to delete at least some of the additional IM session.

Optionally, the IM session is held between a plurality of human participants including the user, a retailer and the computerized agent; wherein the instructions define a split of payment for a product sold by the retailer to the plurality of human participants; further comprising separately authenticating the split or the financial transaction by an additional IM session separately held between the computerized agent and each of the plurality of human participants.

More optionally, the method further comprises acquiring payment data from the retailer; wherein the operation is performed using the payment data.

Optionally, the method further comprises adding an additional computerized agent representing a retailer as an additional participant to the IM session; wherein the additional computerized agent analyzes an additional IM message in the IM session which is received from the user to identify automatically a request to purchase a product or a service from the retailer; wherein the additional computerized agent approves or denies the request by adding a further IM message to the IM session; wherein the financial transaction is between the user and the retailer.

Optionally, the method further comprises acquiring payment data in a direct communication with the additional computerized agent; wherein the operation is performed using the payment data.

Optionally, the financial transaction is a request from the transaction performing entity to perform a bank account operation on a bank account of the user.

Optionally, the IM client module is a messenger application which allows the user to message with a plurality of contacts from a contact list in addition to performing the IM session.

Optionally, the instructions are encoded using at least one emoticon.

Optionally, the IM session comprises a plurality of text messages sent over a Transmission Control Protocol Internet Protocol (TCP/IP) protocol.

According to some embodiments of the present invention, there is provided a system of performing a financial transaction. The system comprises a processor, a computerized agent subscribed to an IM service by a telephone number and set to participate as a transaction performing entity in an instant messaging (IM) session managed by an IM service, wherein the computerized agent is added to the IM session by a user which uses an IM client module, the IM client module runs on a client terminal and used to allow the user to participate in the IM session by inputting text content, the computerized agent analyzes textual content received from the user in the IM session which to identify automatically instructions to perform a financial transaction, a financial transaction module which automatically instructs an operation of the financial transaction by the transaction performing entity. The computerized agent adds to the IM session an IM message indicative of a performance or a denial of the financial transaction by the transaction performing entity and presents the IM message to the user.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 11A and 11B are screenshots of a browser presenting a checkout page enhanced with a web service facilitating checkout by an exemplary IM session initiated by the transaction system, according to some embodiments of the present invention;

DESCRIPTION OF SPECIFIC EMBODIMENTS OF THE INVENTION

Figure 1:
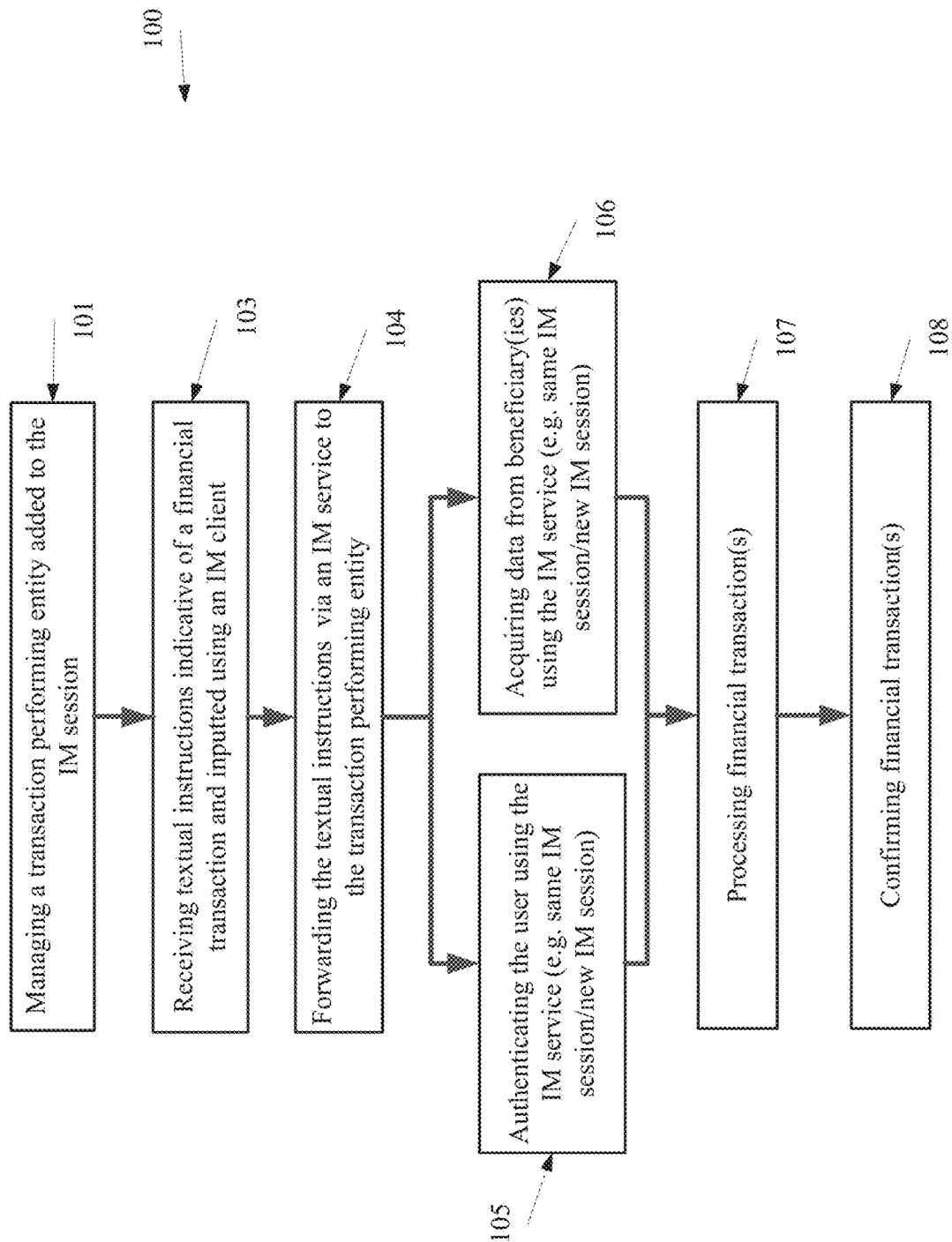
FIG. 1 is a flowchart of a method of performing a user initiated financial transaction using a general IM editor, according to some embodiments of the present invention.

The present invention, in some embodiments thereof, relates to methods and systems of performed financial transactions and, more specifically, but not exclusively, to methods and systems of performing financial transactions in an instant messaging session.

According to some embodiments of the present invention, there are provided methods and systems of allowing a user to perform a financial transaction, such as funds transfer from a bank account and/or a service or a product purchase using an IM service used for to send and receive messages, pictures, audio notes, and/or video messages with a plurality of contacts from a contact list, for example using Whatsapp™, Line™, Skype™, Facebook Messenger™, Facebook™, Google Hangouts™, and/or Telegram messenger. The methods and systems are based on a computerized agent that is associated with an identifier such as a telephone number and added to a chat, such as an IM session with one or more participants, by the user. This addition allows the computerized agent to receive IM messages, to analyze the content thereof, for instance using NLP techniques, and to identify instructions to perform financial transaction(s) therein. The computerized agent can also perform authentication and/or data acquisition IM sessions to verify the identity of the user who gives the instructions and/or to acquire data from beneficiaries which participate in the IM session. The above embodiments allows a user to use the same IM service he uses to message friends for transferring and/or receiving funds and for purchasing services and products. The above embodiments allows the computerized agent to respond to user questions and to request information therefrom by sending text messages thereto in real time, for example few seconds after receiving instructions from the user.

According to some embodiments of the present invention, computerized agents are used by retailers to sell products or services. In such embodiments, these computerized agents send and receive IM messages to receive purchase order and/or to confirm purchase order details.

According to some embodiments of the present invention, the methods and systems allows adding computerized agents to a group chat between two or more human participants, allowing them to transfer funds between their bank account, to purchase product(s) or service(s) together, to coordinate a purchase of tickets and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart 100 of a method of performing a user initiated financial transaction using a general IM editor, such as Whatsapp™ and Line™ that is also used by the user for other purposes such as textual IM sessions with contacts, according to some embodiments of the present invention. The method allows a user to set an IM session with a transaction performing entity agent by adding the transaction performing entity to an IM session and using the native text input user interface of the IM editor, for example Whatsapp™ and/or Line™ application to type messaging instructions which are analyzed by the transaction performing entity agent for performing the financial transaction. The messaging instructions are optionally textual instructions which may or may not include emoticons and/or attachment and inputted using a messaging tool, such as an IM service client. The transaction performing entity may be a retailer, a credit provider, for example PayPal™, a bank and/or the like. Optionally, after the transaction performing entity agent identifies that the user in interested in performing the financial transaction, for instance by applying text analysis techniques, such as natural language processing (NLP) algorithms on the text of the IM session, the transaction performing entity agent initiates using the IM editor an authentication session wherein credentials of the user are verified, for instance by requesting identifying data and/or passwords via the native text input user interface. In such embodiments, the user performs financial transactions by adding the transaction performing entity to an existing or new IM session, for instance without opening a browser, making a call, and/or being required to remember a URL or any other address. A telephonic identifier such as a telephone number associated and verified by the transaction performing entity is optionally added to a contact in the book address of the user. In use, the user adds the contact to an IM session and type or otherwise input user instructions to perform the financial transactions, for instance type "please move 1000$ to my current account from my saving account", "please close 1000$ in a saving account", "I want to purchase X" and "please transfer mummy 1000$".

Optionally, the user messaging instructions indicate to the transaction performing entity that additional contact(s) which are part of the IM session are the beneficiary(ies) of the financial transaction. The additional contact(s) may be persons or computerized agents that represent beneficiary(ies) such as any bank account holder, such as a person or a company. For example, the instructions are "please transfer to Danny and Joe 50$ each" or "please pay for meal number 5 at McDonald™". In such embodiments, the transaction performing entity agent may be added to an existing IM session between the user and the additional contact(s) and may establish a session with the beneficiary(ies) for verifying financial transaction details. For example, after messaging instructions indicative of a financial transactions are identified, a new IM session is established to verify the beneficiary(ies) account details, for instance in a new private IM session between the transaction performing entity and each of the beneficiary(ies). The beneficiary(ies) may be human persons and/or computerized agents, also referred to as agents, which represent a retailer, service provider, and/or a dealer. The agents optionally run on an IM communication system, such as a server, that is set to automatically communicate with an IM service for concluding financial transactions held in an IM session, such as good and service purchases, for instance as described below. The IM service may be any system that allows users who uses IM client modules, such as messenger applications, to send and receive messages, pictures, audio notes, and/or video messages with a plurality of contacts from a contact list. Optionally, the messages are encoded and/or set with a deletion term for enabling automatic deletion thereof from the memory of the sending and/or receiving IM session participants after a period (e.g. few seconds, minutes, and/or hours) and/or when a term is complied with. For example, the IM service is Telegram Messenger™. Optionally, the messages are encoded in Transmission Control Protocol Internet Protocol (TCP/IP) protocol.

Figure 2:
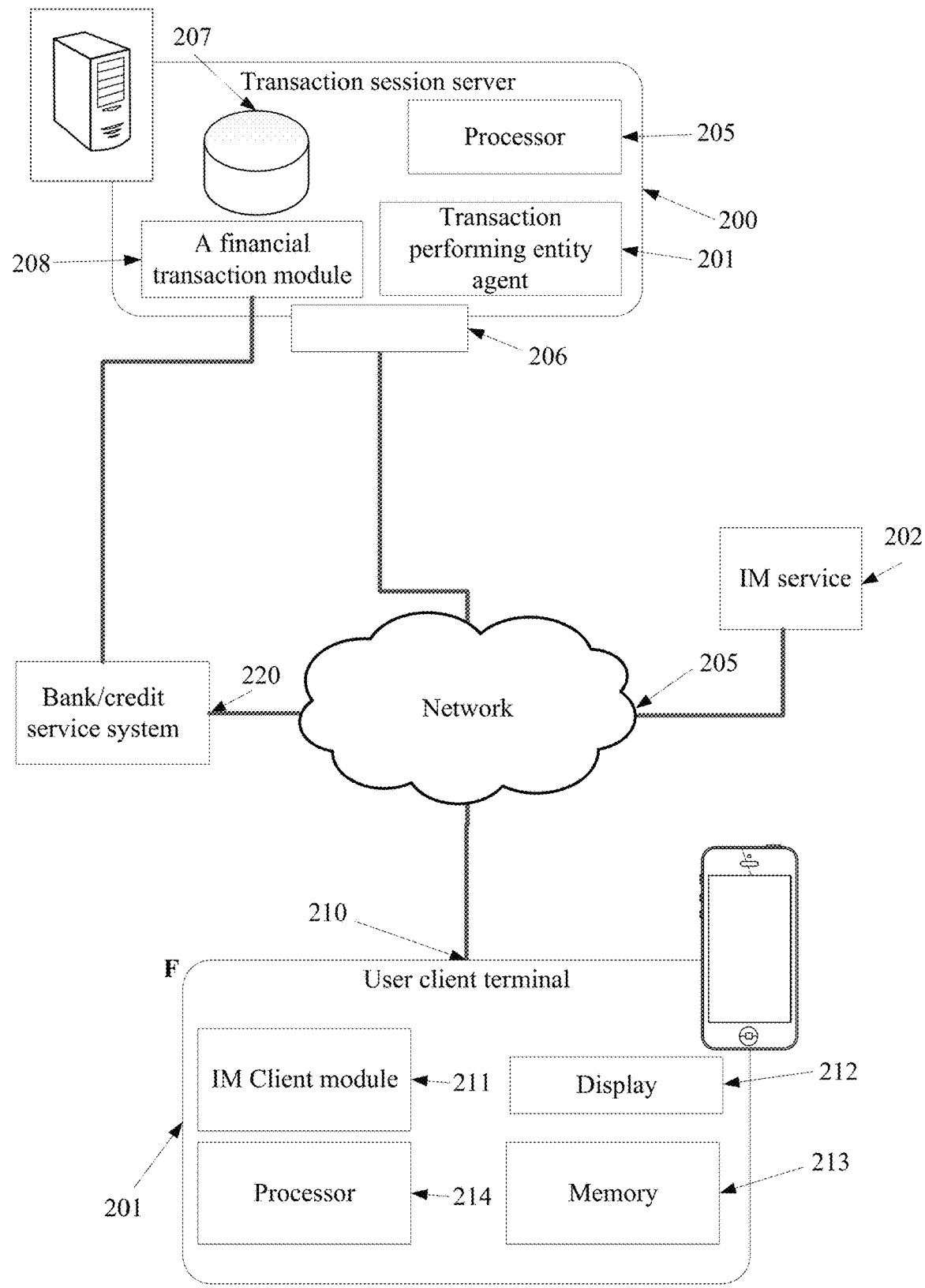
FIG. 2 is a schematic illustration of a transaction system for managing an addition of a transaction performing entity agent to a messaging session to allow automatic identification and authentication of financial transaction, initiated by a user using a user client terminal, according to some embodiments of the present invention.

Reference is now also made to FIG. 2, which is a schematic illustration of a transaction system 200 for managing an addition of a transaction performing entity agent 201 to a messaging session to allow automatic identification and authentication of financial transaction, initiated by a user using a user client terminal 210, according to some embodiments of the present invention. The financial transaction may be between the user and a bank/credit service system 220 or between the user and one or more beneficiary(ies) using the bank/credit service system 220 as transaction facilitator.

The transaction system 200 is optionally implemented using one or more network connected servers, each processor 205 based, which have a port 206 for establishing communication with an IM service 202, for example an existing IM service, such as Whatsapp™, iMessage™ or Line™. The port 206 is optionally a cellular interface that allows emulating a connection to the IM service 202 as a client which is identified by a telephone number, such as a Smartphone or a tablet. Such a cellular interface runs a client application such as a Whatsapp™ and Line™, which is registered to the IM service 202 using a phone number of the financial entity, for example a cellular network number authenticated in an SMS authentication process, as commonly known in the art.

The transaction system 200 further includes or connected to a memory or a database 207 that stores subscribers data, for instance user records each indicative of user account(s), such as bank account or a debit and/or credit accounts, credentials and user identifier, such as a cellular phone, ID number and/or the like. For example, the database 207 include records of bank account holders of a transaction performing entity such as a bank and/or records of credit account holders of a transaction performing entity such as a credit company. Optionally, a user account is an account documenting and storing digital currencies, such as Bitcoin. In such embodiments, the credit provider manages the transfer of Bitcoin from one entity to the other.

The transaction performing entity agent 201 is set to receive messages of an IM session from the IM service 202, for instance via port 206 and to perform text analysis which analyzes the IM communication to identify text instructions indicative of requests from human users which are documented in the database 207 to perform financial transaction(s).

For example, a user uses an IM service client 211 installed on a user client terminal 210, such as a smartphone, to establish an IM session that includes the transaction performing entity agent 201 by adding a contact representing the transaction performing entity agent 201 to an IM session managed by the IM service 202. The user client terminal 210 may be any device that includes a processor 214 for executing the IM client module 211, for instance a general IM editor, and a presentation unit, such as a display 212 for presenting a graphical user interface (GUI) of the IM client module 211, for example the general IM editor. The IM client module 211 may be an installed application and/or a web service that is running on the user client terminal 210. The user client terminal 210 may be a handheld device or a wearable device such as Google GLASS™.

The transaction performing entity agent 201 analyses messages from the IM client module 211 to identify text instructions indicative of financial transaction(s) and also set to respond to the text instructions by replying to the text instructions with IM messages, for example confirmation messages or queries for more data. In such a manner, the transaction performing entity agent 201 manages an IM conversation with the users, for example as further described below.

The transaction system 200 further executes a financial transaction module 208 which generates message(s) encoding instructions to perform financial transaction(s). The messages are forwarded to a bank/credit service system (s) 220 for processing of the financial transaction by the financial entity that is associated with the transaction performing entity agent 201.

The transaction system 200 may ran a plurality of transaction performing entity agents 201 each for a different bank/credit service of different banks or service providers for completing financial transactions. Optionally IM sessions from different IM services 202 may be analyzed using the transaction system 200.

Figure 3:
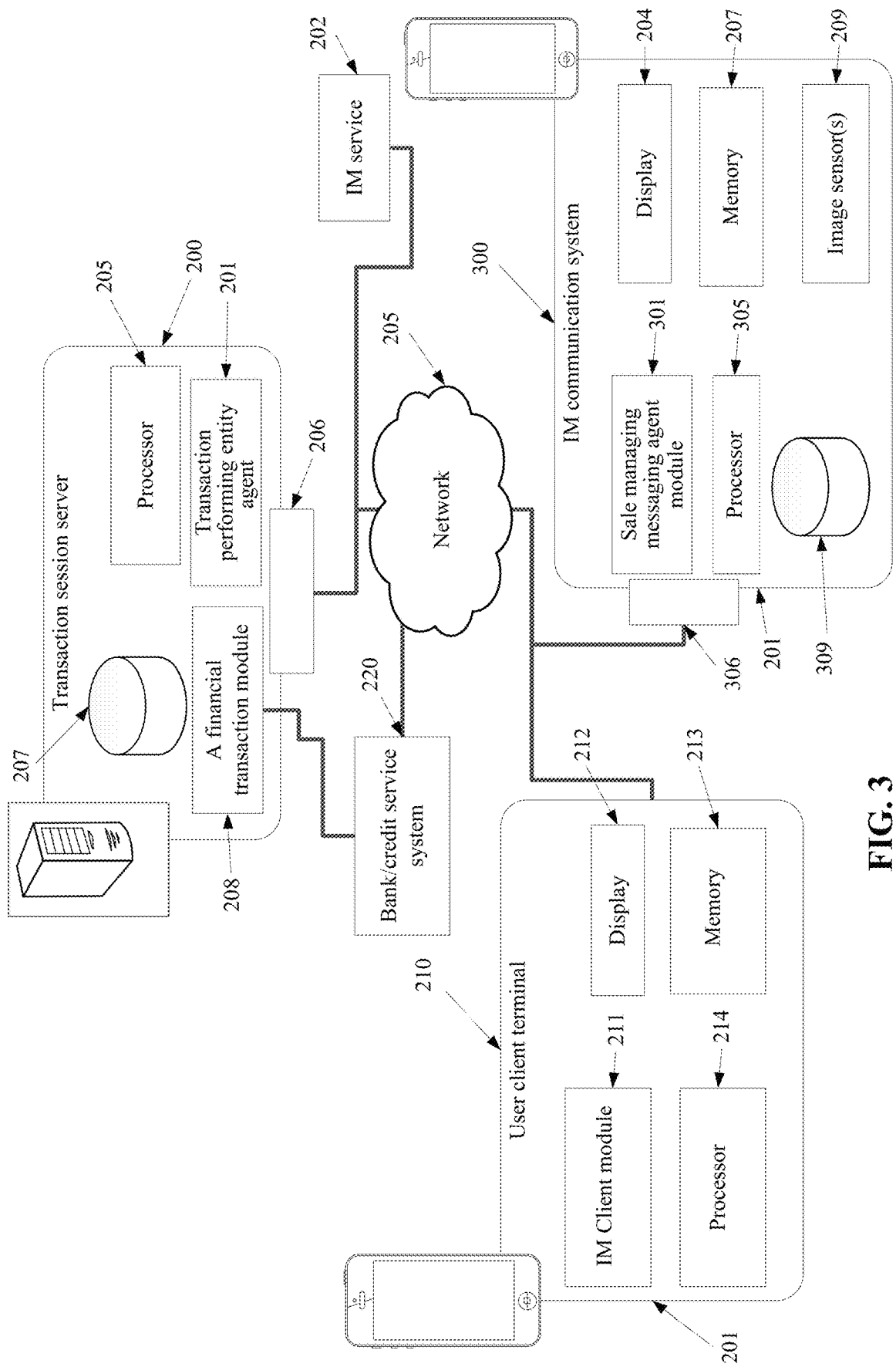
FIG. 3 is a schematic illustration of the transaction system and the user client terminal which are depicted in FIG. 2 and an IM communication system for allowing a beneficiary to sell products or services in an IM session, according to some embodiments of the present invention.

Reference is now also made to FIG. 3, which is a schematic illustration of the transaction system 200, the user client terminal 210, and an IM communication system 300 for allowing a beneficiary, such as a retailer or a service provider, to sell products or services in an IM session by an addition of a sale managing messaging agent 301 to a messaging session to allow automatic participation in a financial transaction with a user, such as an IM session participant.

The IM communication system 300 is optionally implemented using one or more network connected servers, each processor 305 based, which have a port 306 for establishing communication with the IM service 202. The port 306 is optionally as port 206. The sale managing messaging agent 301 receives instant IM communication addressed to a retailer or a service provider from the IM service 202, for instance via port 306 and performs a text analysis of the IM communication to identify purchase instructions indicative of requests from human users to purchase goods or services and authentication messages from the transaction system 200. The sale managing messaging agent 301 is also set to respond to text instructions identified from the text analysis and authentication messages by replying to the text instructions and the authentication messages with IM messages. Optionally, the text analysis module 309 manages an IM conversation with the users and with the transaction system 200, for example as further described below. The sale managing messaging agent 301 may use NLP processes for analyzing the IM session content, for example as known in the art. The sale managing messaging agent 301 may implement all or some of the functionalities of agent 201, allowing using the addition of a retailer agent to perform transaction with the retailer and/or among a number of users.

For example, the IM communication system 300 identify in the text or emoticons used in an IM session between the user which uses the user client terminal 210 and the sale managing messaging agent 301 a request to purchase plane tickets and responds with additional details for confirmation, an acceptance and/or a denial message, optionally after managing a chat for acquiring and/or confirming details with the user, for instance a chat that requests seat preferences, time preferences, age and/or gender verification and/or the like.

Optionally, the sale managing messaging agent 301 implements the above describe functions of the transaction performing entity agent 201. In such embodiments, a user may add the managing messaging agent 301 to an IM session without adding the transaction performing entity agent 201 separately. The managing messaging agent 301 may manage a sale including conducting the transaction, analyzing the text messages received before and/or after the addition thereof to the IM session.

According to some embodiments of the present invention, the sale managing messaging agent 301 is set to coordinate a meeting or a gathering location between the participants of the IM session. In such embodiments, the sale managing messaging agent 301 may coordinate the arrival to a point of sale or service, for example to a concert hall, a restaurant, a theater and/or the like. A transaction related session may be managed by the sale managing messaging agent 301 and/or the transaction performing entity agent 201 after or before the service and/or products(s) are given the participants, for example as described above. Optionally, location of participants is monitored by a locally installed module, such as an application. For example, the sale managing messaging agent 301 represents a restaurant. In use, a table is reserved for participants by adding the sale managing messaging agent 301 to an IM session and requesting a table, for example: "restaurant: please reserve a table for 6 for tomorrow at 2100". A confirmation or an availability suggestion may automatically follow. Few hours before the event, the sale managing messaging agent 301 may send an IM message, reminding the participants about the upcoming event and location. Optionally, the sale managing messaging agent 301 can update participants if needed, for example when a change of time is required or instructed and/or the like. Optionally, may monitoring a location of a participant, automatic arrival or time to arrival data may be calculated and presented to the members of the respective IM session by the sale managing messaging agent 301, for example "John has arrived". In the end of the event, one of the participant may instruct the sale managing messaging agent 301 to provide the group with the bill, for example by texting restaurant: "bill please". The sale managing messaging agent 301 is optionally synchronized with the billing system of the restaurant, can present the bill and the details thereof by adding a suitable text message to the IM session. The bill may be provided as an image. This allows paying the bill in any of the herein described methodologies, for example by instructing one or more credit providers to pay or share the bill.

Optionally, the IM communication system 300 accesses a database 309, such as a client database to acquire details about the user, for instance a client record, for instance based on the IM editor identifier thereof (e.g. a telephone number). The client record may include an address, demographic data, and/or historical purchases. In such a manner, a delivery may be conducted automatically after the financial transaction is approved.

Reference is now made, once again, to FIG. 1. First, as shown at 101, the transaction performing entity which is added to an IM session, either new or existing by a user. The addition may be by an IM editor, such as an IM application installed on her client terminal, for instance a Smartphone, a tablet, or a wearable device, such as Google GLASS™, or by reading a machine readable code or in response to a browser user input, for instance as described below. The addition is optionally done by selecting a contact from the contact list of the IM application, for instance a contact marked by the user as "My Bank" and associated with the phone number of the bank. Optionally, the user uses a GUI which is external to the IM service for instructing the transaction performing entity agent 201 to initiate an IM session with him and one or more other participants. For example, a user may input contact(s) and/or contact details into a GUI of an application that is installed on the user client terminal 210 and/or a browser GUI triggered by a user selection of a link or an interactive icon which may be presented on a certain webpage, for example as described below. The request is forwarded to the system 200 which instructs the transaction performing entity agent 201 to initiate a new IM session with the requesting user and the one or more other specified participants. It should be noted the IM session may be implemented on any asynchronous chat platform. In one example, the GUI is a browser generated window or banner having fields for selecting or inserting contact details of one or more participants and optionally a title for the new IM session.

Optionally, as shown at 102, the user adds one or more beneficiaries to the IM session. The addition is optionally done by selecting contact(s) from the contact list. Optionally, a registration process is managed for a new user, either via a designated webpage or via the IM service, for example by using the IM service as a platform for acquiring user registration data such as name, ID, credentials, preferred payment credit provider and/or the like.

Figure 5B:
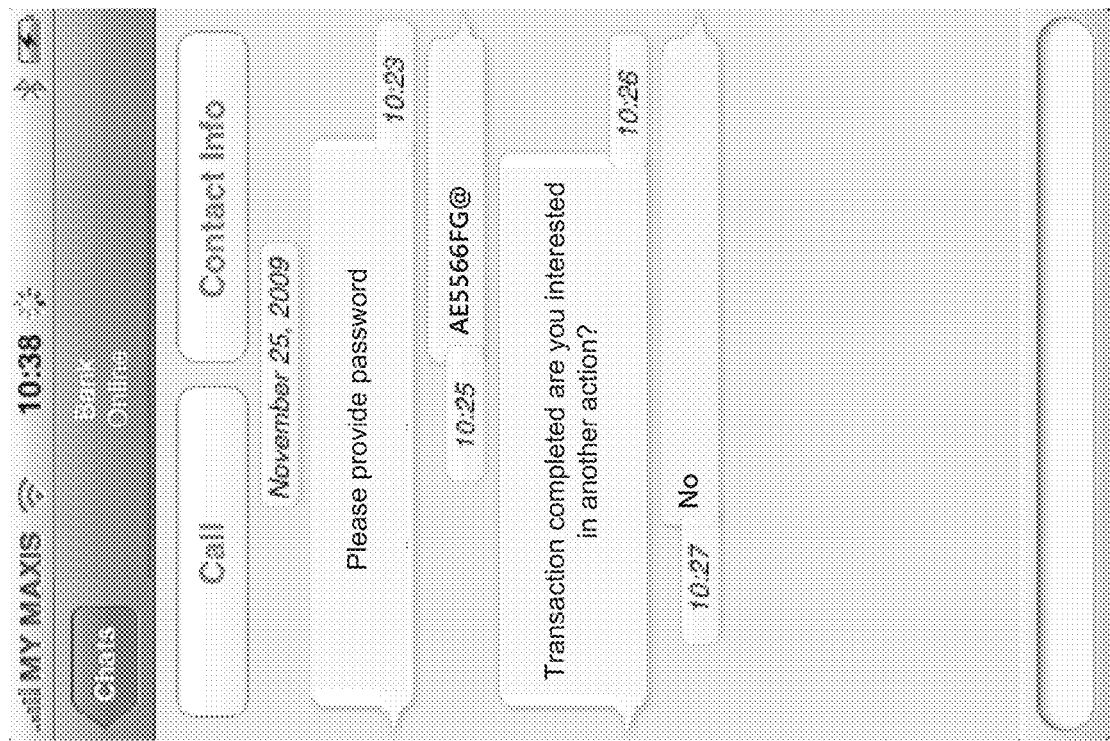
FIGS. 5A, 5B, and 5C are, respectively, a screenshot of a general IM editor that presents an exemplary IM sessions between the user, a number of his contacts and the bank agent with exemplary IM messages therebetween, a screenshot of the IM editor when presenting an authentication session with the user and screenshot of the IM editor when presenting a data acquisition session with one of the contacts in the IM session, according to some embodiments of the present invention.
Figure 5A:
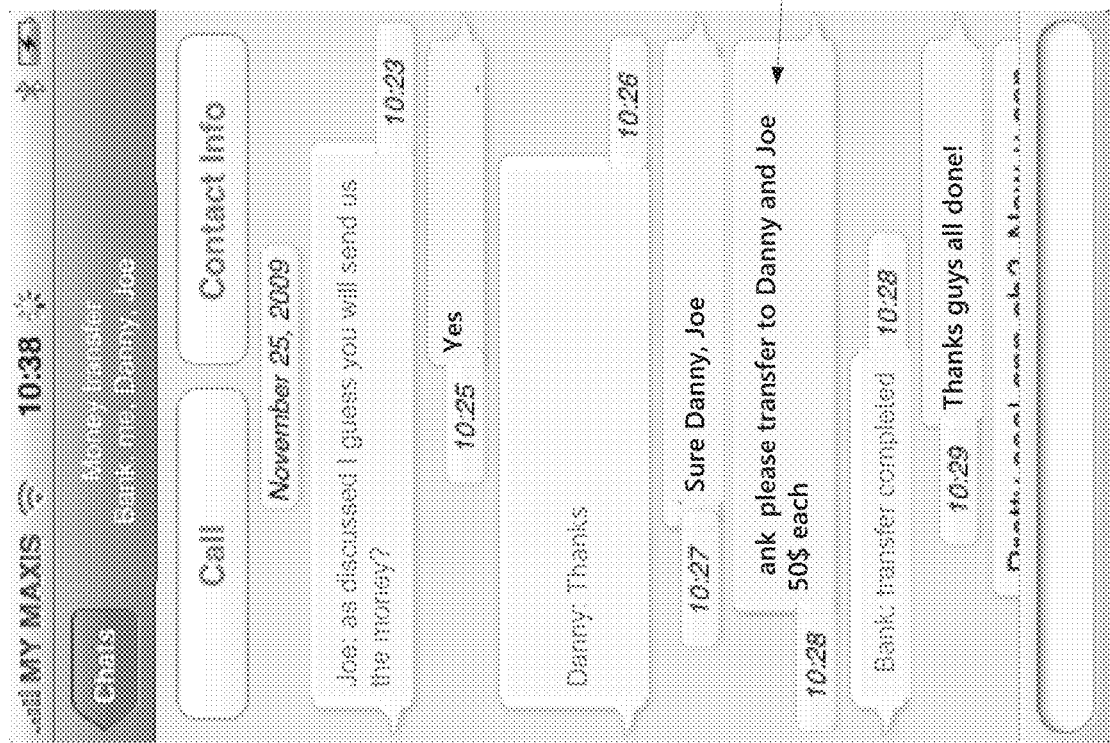

Now, as show at 103, the user input messaging instructions indicative of a financial transactions, for example "forward 100$ to Ronnie", "move 100$ to a saving account", "buy a ticket to Rolling Stones show in Manhattan tomorrow" and/or the like. Messaging instructions may include emoticons indicative of financial transaction and/or authentication information such as user credential, optionally encoded. As shown at 104, the messaging instructions are forwarded by the IM service 202 as an IM message to the transaction system 200 to be read by the transaction performing entity agent 201. Optionally, each message to the transaction performing entity agent 201 is preceded with a credit providing entity name, for example bank (as shown in FIG. 5A, PayPal, Citi Bank, Bitcoin manager, and/or the like). This allows selecting adding a number of credits providing entities to an IM session and selecting one when needed. Optionally, the transaction performing entity agent 201 reads only messages which include a reference thereto. This assures the privacy of the participants, not giving an access to a chat content not related to the respective transaction. Optionally, the transaction performing entity agent 201 read messages in the IM session which are not directed to him. This may be used for contextual analysis, allowing the transaction performing entity agent 201 to conclude, using NLP analysis, who is paying, how much, when and for what. As shown at 105, this may trigger the authentication of the user, for instance by submitting textual questions by the text analysis module 209 to the IM service server 202 as inputs to the IM sessions. For example, the text analysis module 209 submits a text message for authentication, for instance "Danny, what is your password?", or any security question. The submitted text message may be part of the IM session or trigger the initiation of a new IM session with the user. Optionally, the authentication is held by a supporting authentication module, such as an application, presenting to the user a window with security questions and/or depends for a password. The supporting authentication module may be locally managed by a locally installed application and triggered by the transaction system 200. In other embodiments, the supporting authentication module is loaded by a browser locally installed in user client terminal 210. For example, after the transaction system 200 identifies that the user instructed the transaction performing entity agent 201 to perform a transaction, it triggers the presentation of a GUI on the display of the user client terminal 210, either by sending a message to a locally installed application or by pushing data to the browser. The above allows authentication the transaction is a separate and secured session which is separated from the IM service 202. Additionally or alternatively, authentication may be acquired using biometric sensors which are installed in the user client terminal 210, for example a finger reading application, an image processing application which receive an output of the image sensor of the user client terminal 210, a gesture analysis module, a typing pattern module, and/or the like.

Optionally, as shown at 106, the above may trigger acquiring information from the beneficiary(ies), for instance by submitting textual questions by the transaction performing entity agent 201 to the IM service server 202 as inputs to the IM sessions. For example, the text analysis module 209 submits a text message for acquiring account data, for instance "Ronnie, what is your account?". The submitted text message may be part of the IM session or trigger the initiation of a new IM session with the beneficiary(ies).

Optionally, details of the participants of the IM is extracted from the IM service or the IM service client to perform the financial transaction, for example extracting the associated telephone number to facilitate crediting or debiting an account associated therewith.

As described above, a beneficiary may be represented by an IM communication system, such as 300, which is set to automatically communicate with the user and/or the transaction system 200 in the IM session for concluding financial transactions. In such embodiments, the communication between the transaction system 200 and the IM communication system 300 may be encoded, for example text cyphered, in an IM session.

Now, as shown at 107, the financial transactions is processed by the bank/credit service system 220 based on the messaging instructions and optionally the authentication and/or acquired beneficiaries data. Optionally, a reminder to delete any credentials given during the IM session is sent to the user and optionally other participants of the IM session. Optionally, the IM service is instructed to delete any credentials given during the IM session. Optionally, the IM service is set to delete any communication that includes passwords and conducted with the transaction performing entity 201. Optionally, access to the IM session is password protected. Optionally, the IM service is set to delete any communication conducted with the transaction performing entity 201 and/or include sensitive information after a predefined time.

Optionally, as shown at 108, the status of the processed financial transaction is received at the transaction system 200 and presented to the user as part of the IM session, for example "financial transaction completed" or "financial transaction denied."

Optionally, after the transaction is completed and/or after a predefined period, for example after 1 minute, 5 minute, one day or any intermediate period, the transaction performing entity agent 201 leaves the IM session. Optionally, a participant may instruct the transaction performing entity agent 201 to leave by typing "agent, please leave session" or by entering an agreed icon(s).

Figure 4B:
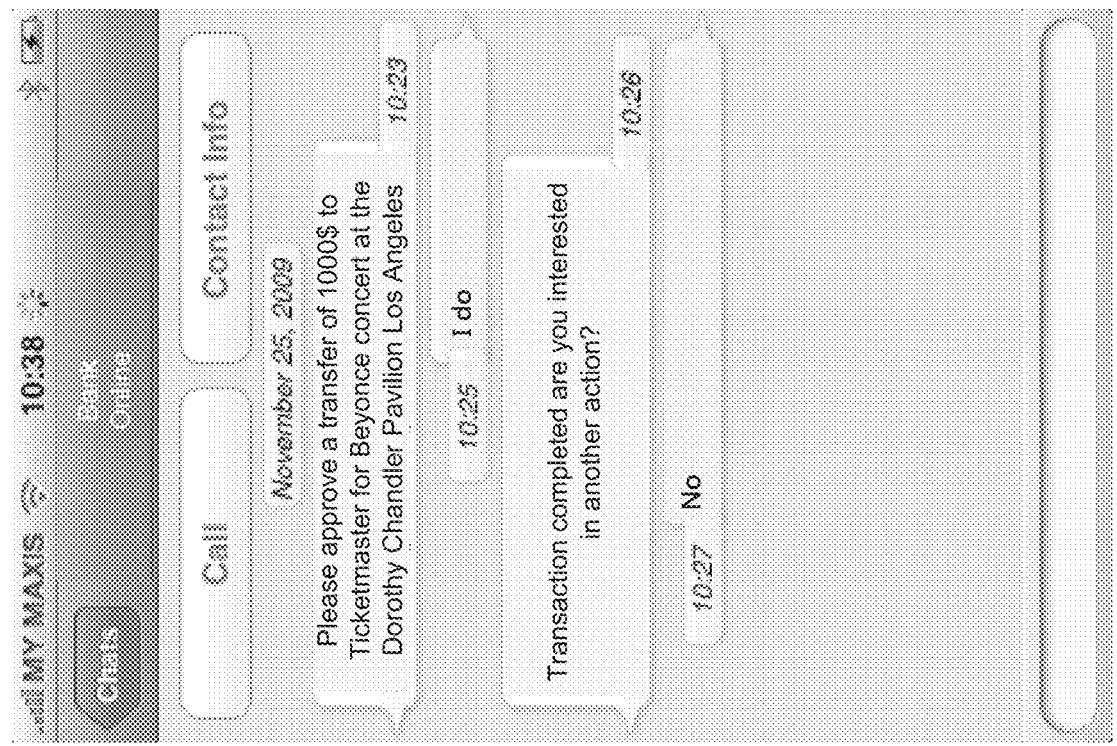
FIGS. 4A and 4B are, respectively, a screenshot of a general IM editor that presents an exemplary IM sessions between the user, a sale managing messaging agent and the bank agent with exemplary IM messages therebetween and a screenshot of the IM editor when presenting an authentication session with the user, according to some embodiments of the present invention.
Figure 4A:
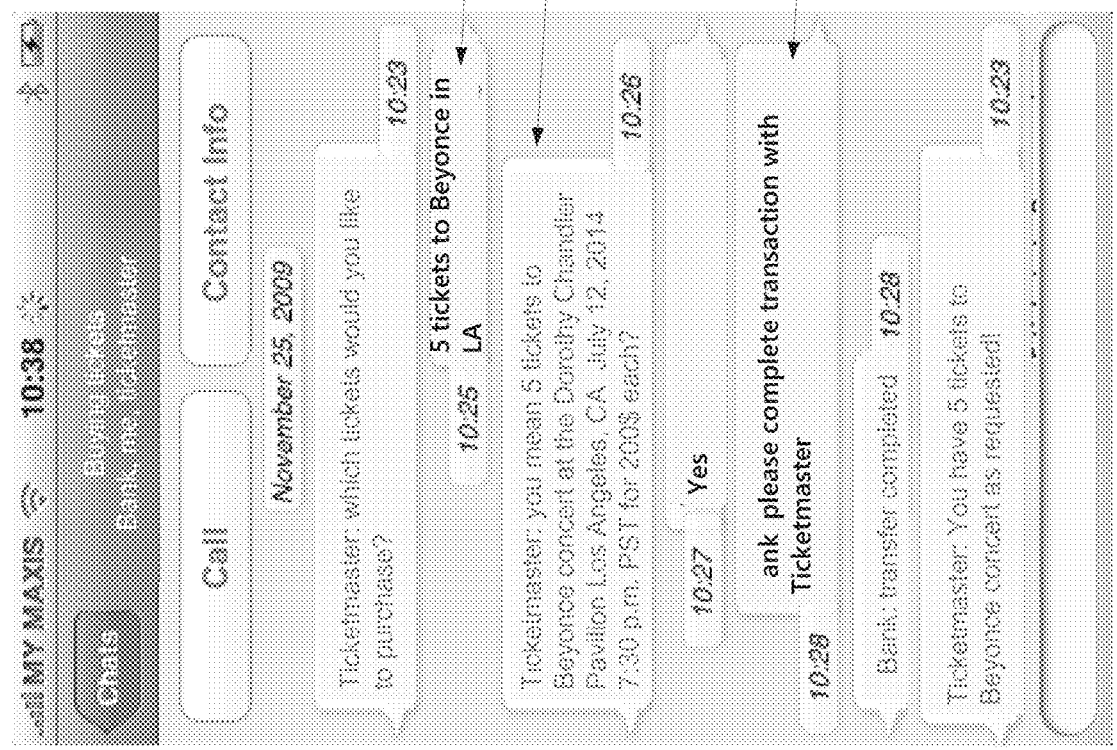

In an exemplary scenario, a user creates an IM session by adding the contact of the IM communication system 300 and the contact of the transaction performing entity agent 201 to the IM session. FIG. 4A is a screenshot of a general IM editor that presents an exemplary IM sessions between the user, Ticketmaster agent and the bank agent with exemplary IM messages therebetween wherein tickets are ordered from Ticketmaster and the bank is instructed to transfer money to Ticketmaster, based on messaging instruction from a user. The user types or otherwise inputs instructions to purchase concert tickets, as shown at 391. The instructions are processed by the sale managing messaging agent of Ticketmaster, for instance using NLP module. The IM communication system 300 of Ticketmaster responds, as shown at 392, with a purchase confirmation request message and then with an order acceptance message, after receiving from the user the confirmation of the purchase details. As shown at 393, the bank is order to complete the transaction. Now, as shown at FIG. 4B, the transaction system 200 initiates an authentication session with the user and optionally a data acquiring session with the communication system 300 of Ticketmaster. When these sessions are concluded with authentication of the transaction, the IM communication system 300 instructs sending a delivery of the tickets to the physical address or the virtual address of the user, either by asking the user or accessing a receptive client record.

In another exemplary scenario, a user creates an IM session by adding the contact of his friend(s) and the contact of the transaction performing entity agent 201 to the IM session. FIG. 5A is a screenshot of a general IM editor that presents an exemplary IM sessions with exemplary IM messages wherein funds are transferred by a bank, based on messaging instruction from a user, as shown at 400, to user selected beneficiaries. As shown at 401, the user type instructions to move funds to his added friends. Now, the transaction system 200 analyzes to text instructions in the IM to identify the request. Optionally, the transaction system 200 initiates an authentication session with the user, optionally in a separate IM session as exemplified in FIG. 5B.

Figure 5C:
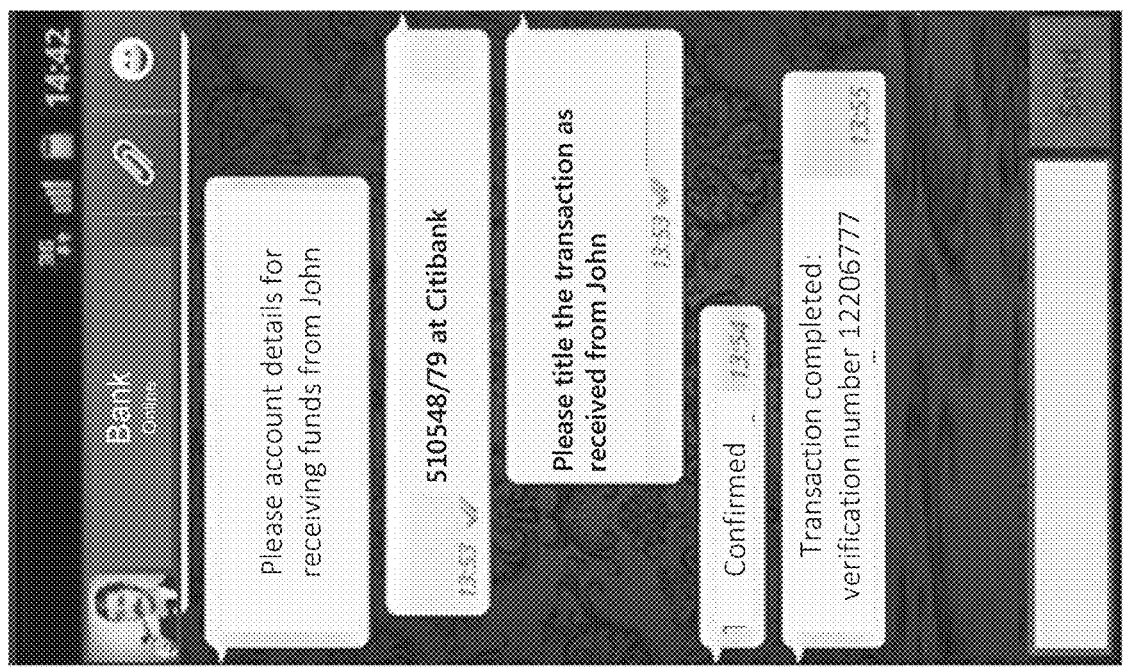

Optionally, the transaction system 200 initiates a data acquisition session to acquire account details from the friends, for example as shown at FIG. 5C. When these sessions are concluded with authentication of the transaction, the transaction system 200 instructs a financial entity, such as a bank to perform the financial transaction of fund transfer to the friend. Optionally a notification about the completions of the financial transaction is sent to the parties.

Figure 6:
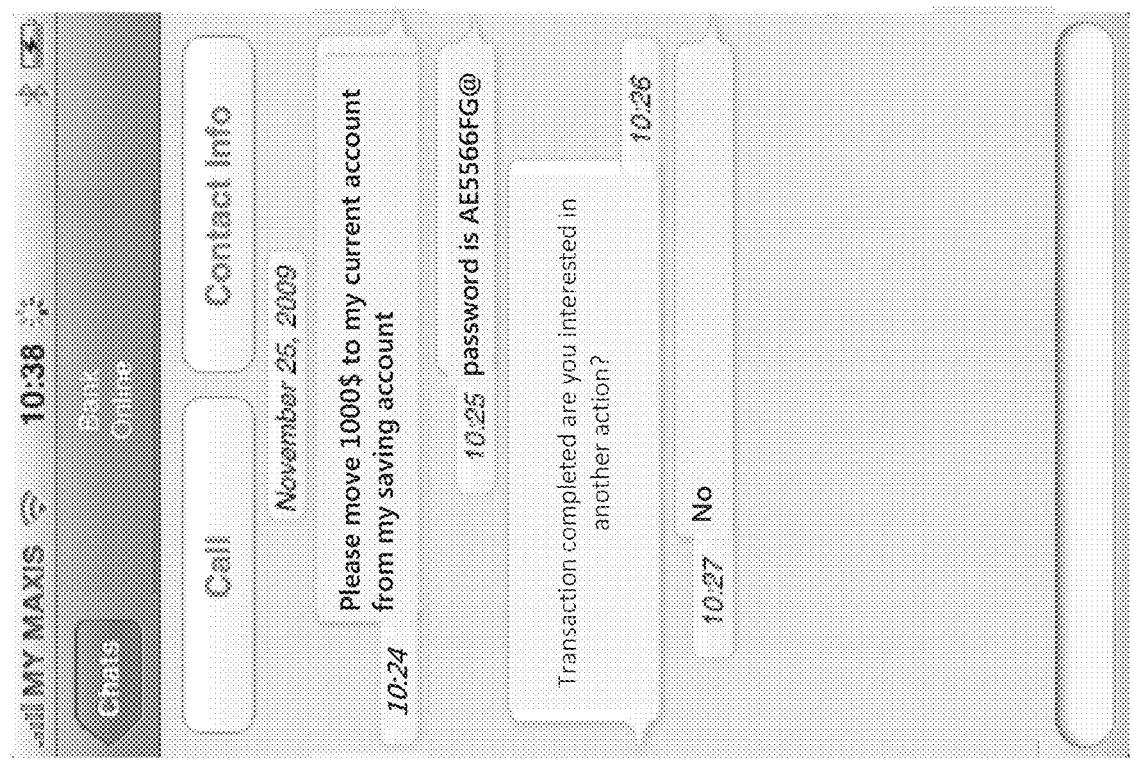
FIG. 6 is a screenshot of a general IM editor that presents an exemplary IM sessions between the user and the bank agent with exemplary IM messages therebetween, according to some embodiments of the present invention.

In another exemplary scenario, a user creates an IM session by adding the contact of the transaction performing entity agent 201 to the IM session to perform a bank account action. FIG. 6 is a screenshot of a general IM editor that presents an exemplary IM session with exemplary IM messages wherein bank account operation is performed based on messaging instruction from a user. The user type instructions to move funds to or from a saving account or the like. Now, the transaction system 200 analyzes to text instructions in the IM to identify the request and initiates an authentication session with the user. When these sessions are concluded with authentication of the transaction, the transaction system 200 instructs a financial entity, such as a bank to perform the financial transaction.

Figure 7B:
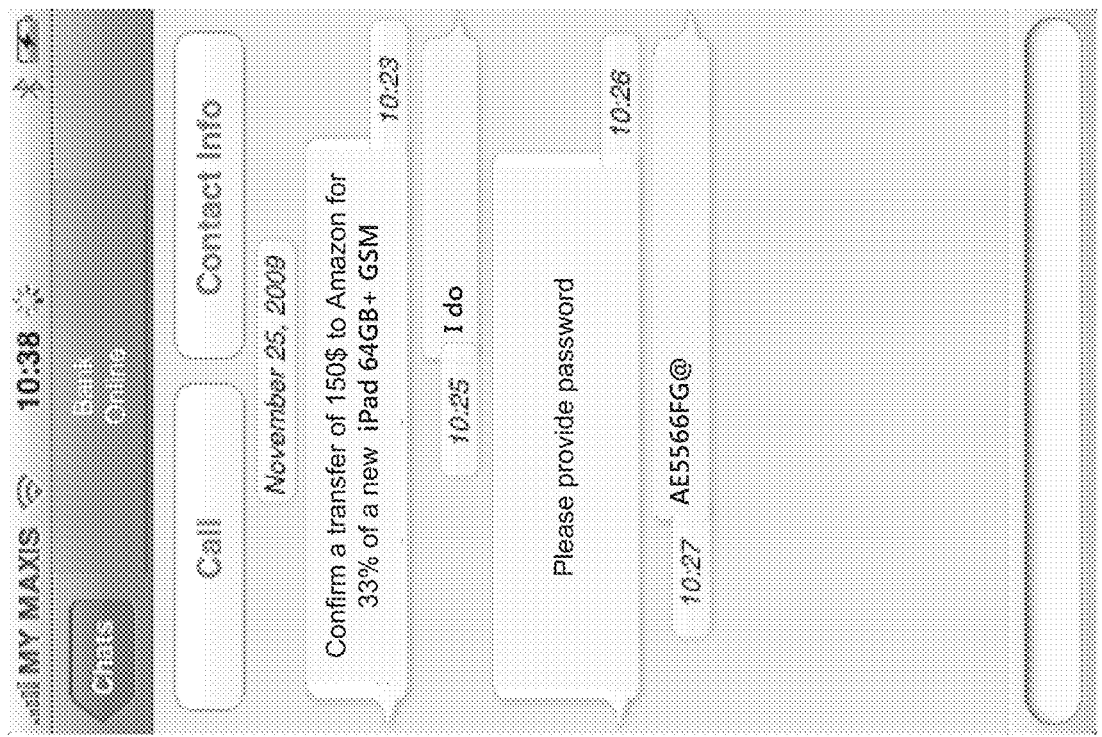
FIGS. 7A and 7B are, respectively, a screenshot of a general IM editor that presents an exemplary IM sessions between the user, a number of his contacts, a sale managing messaging agent and the bank agent with exemplary IM messages therebetween and a screenshot of the IM editor when presenting an authentication session with the user, according to some embodiments of the present invention.
Figure 7A:
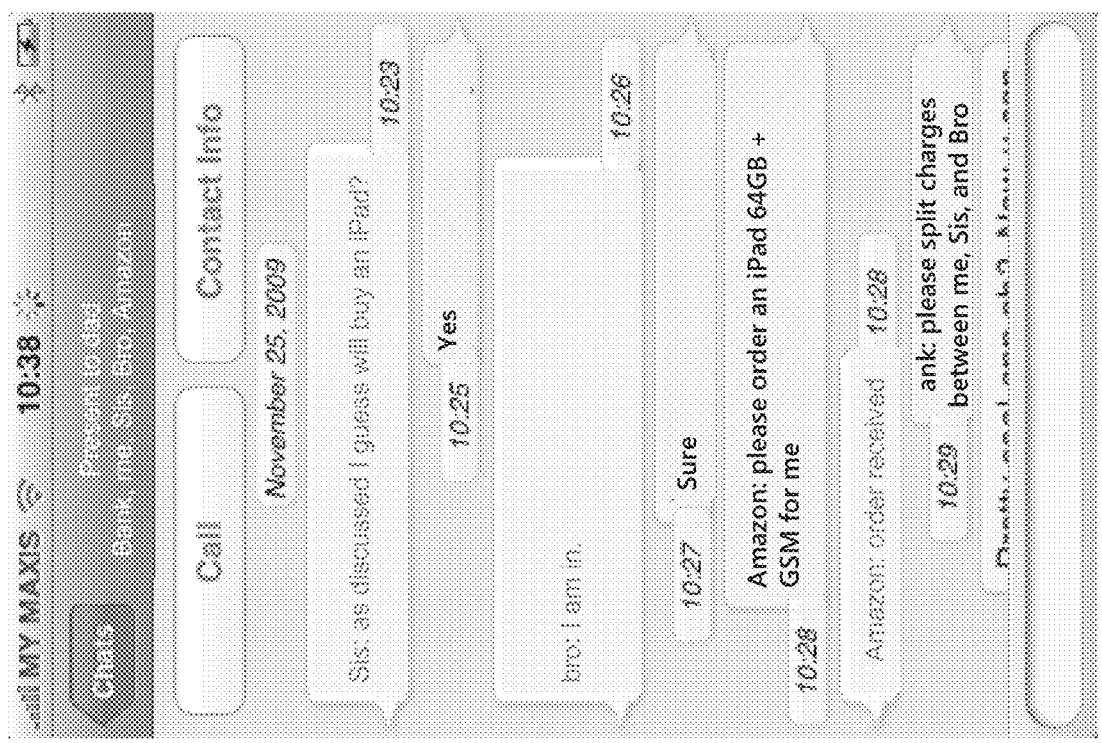

According to some embodiments of the present invention, the financial transaction is a group purchase. In such embodiment, a number of participants of an IM session, for example a group session for purchasing a present are debited for a financial transaction that is instructed by messaging instructions inputted as an IM message in the IM session by one or more of the participants. FIG. 7A is a screenshot of a general IM editor that presents an exemplary IM session between a user, two of his contacts, a bank, and a selling entity, with exemplary IM messages for ordering from a selling entity (Amazon in this example) a product and instructing a bank, based on messaging instruction from the user, to split the charges for the order among participants of the IM session. In such embodiments, two or more participants of an IM session may agree to split charges of a purchase of a product, for example an iPad, for example by communicating with the IM communication system 300 of a retailer, in this case Amazon. In use, one of the users adds the contact of the IM communication system 300 (in this case Amazon) and the contact of the transaction performing entity (in this case the bank) to the IM session with the participants. This allows the transaction system 200 and optionally the IM communication system 300 to receive messaging instructions by analysis of the text and/or emoticons in the IM session, and splitting the charges among the participants. In such embodiments, the transaction system 200 may initiate a separate authentication process with each one of the participants, for example as shown at 7B, and optionally with the IM communication system 300, for example similarly to the described above. In such embodiments, while the approval and/or the readiness to participant in a financial transaction is deduced from textual analysis of the text in one IM session, a number of separate new IM sessions may be used to authenticate the financial transaction and optionally to acquire payment means data. The above embodiments allow the group of participant to place a cumulative order without having to access separately a dealer website or a dealer application. Optionally, when a participant fails to approve the transaction, a new division of payments may be suggested to the other participants of the IM session to approve. For example, new IM messages are loaded by the transaction performing entity agent 201 to split the charges accordingly. Optionally, new participants may be added to the IM session, allowing calculating a revision of the charges.

The above embodiments allows the group of participant to place a cumulative order to a product, splitting the cost between them without having to use only one account for the whole cost. From the transaction performing entity point of view, the placed order is processed when the payments are divided to a number of different accounts (e.g. bank, credit, or debit accounts). This allows a number of people to purchase an expensive gift or a shared product, such as a coffee machine to a classroom or a lab.

Similarly to the described above, a direct communication between the transaction system 200 and the IM communication system 300 may be established to validate and/or complete the transaction.

Similar to the above, products for each participants may be added in a single IM session, for example a T-shirt per participant, a basketball ticket per participant, a television set per participant, or a service per participant, such as an access to a multiplayer game or a video on demand content. In such embodiments, the messaging instructions may be "we would like to order basketball tickets to all of us", "we would like to participate together in an online game X" and/or the like. From the transaction performing entity point of view, the placed order may be processed together so as to allow allocating nearby seats for group members (e.g. to a concert or a sport game), and/or any group related activity.

It should be noted, as exemplified in FIGS. 4A, 5A, and 7A that the IM client module may also be used by the user to communicate with IM session participants which may or may not be involved in the financial transaction.

According to some embodiments of the present invention, a contact of the transaction performing entity agent 201 and/or the sale managing messaging agent 301 is suggested to a user browsing to a website that allows paying using the above described systems and/or methods. The contact may be associated with an interactive icon, a text line, for instance "PayChat Now", or a link to a contact, triggering the downloading of the respective contact(s) in response to a user selection. In some embodiment, a user selection on an icon or a link will trigger an invitation of the user to an IM session with the transaction performing entity agent 201 and/or the sale managing messaging agent 301. In such embodiments, the user may be required to provide his phone number to allow the system to connect the transaction performing entity agent 201 and/or the sale managing messaging agent 301 thereto automatically. A GUI may also allow the user to request an automatic initiation of a new IM session with two or more human participants. For example, in response to the user selection and/or browsing action(s) a GUI, such as a window which allows the user to input contacts and/or contact details and optionally a group name is presented to the user. This allows the user to request a generation of a group IM session with the transaction performing entity agent 201 and/or the sale managing messaging agent 301 from a certain web document such as a webpage and/or from an application facilitating sending such group IM session initiation requests. In such embodiments, registration process may be held separately with each one of the invitees, optionally independently, for example as described above. The group IM session initiation is optionally managed by the transaction performing entity agent 201 and/or the sale managing messaging agent 301, for example as if a human participant request a group generation.

Optionally, the transaction performing entity agent 201 and/or the sale managing messaging agent 301 are set to instruct users how to use the systems 200 and/or to perform registrations, 300, for example in separate IM sessions.

In one example, a user uses a browser installed in the user client terminal 210 to visit a webpage promoting a product, such as a tablet. In use, the user selects an icon presented on the webpage, for example an icon marked with a "PayChat service" icon.

In response to the selection of the icon, a window is presented to the user, allowing him to select one or more contacts and optionally presents him with suggested name for a group session, for instance "our tablet present". The user selects one or more of his contacts, for example from a list updated based on his contacts and optionally input his name or nickname. Optionally, details for an addressee for the purchase are also acquired via the window. In this example, the user input his name, Dani and the addressee name, Roni. The window also allows the user to indicate how the payment will be divided, optionally after presenting an even division as a default. Optionally, the window is dynamically generated based on the product(s) or service(s) which are presented to the user. In such a manner, when the user is in a webpage selling a tablet, the window will relate to details regarding the price and/or features of the sold product in the window for the user to confirm. Additionally or alternatively, details extracted from the webpage are forwarded to the system 200 for allowing the respective agent to manage the IM session accordingly, presenting suitable product or service details to the participants of the IM session.

The system 200 instructs the sale managing messaging agent 301 to initiate a group session with the selected contacts. The sale managing messaging agent 301 generates via the IM service 202 a new group session and adds an opening IM message "Dani invite you to share a buy of a tablet for Roni, the price is 50$ per participant". User inputs made with the window and optionally an analysis of data from a respective webpage, such as the icon hosting webpage are forwarded to the system 200. The system 200 computes a message accordingly. The selected contacts, now participants of the IM session, can now complete the purchase as described above, for example with reference to FIGS. 7A and 7B. A transaction performing entity agent 201 may be added to the session, either automatically by matching the user(s) with respective documented user records or manually by any of the participants.

In another example, a user accesses a GUI presented by an application to input data regarding a desired transaction. The data may include product and/or service description and/or a link to a respective webpage, contacts and/or contact details, a name, a title, and/or a present addressee. The GUI forwards the data to the system 200 which instructs the transaction performing entity agent 201 and/or the sale managing messaging agent 301 to initiate an IM session accordingly. The link may be to a website of the credit provider, for instance www(dot)Citibank(dot)com/paywith-paychat/=citi&oq=citi&aqs=chrome(dot)69i57j015(dot)183 where 69i57j015(dot)183 is a token value.

Figure 8E:
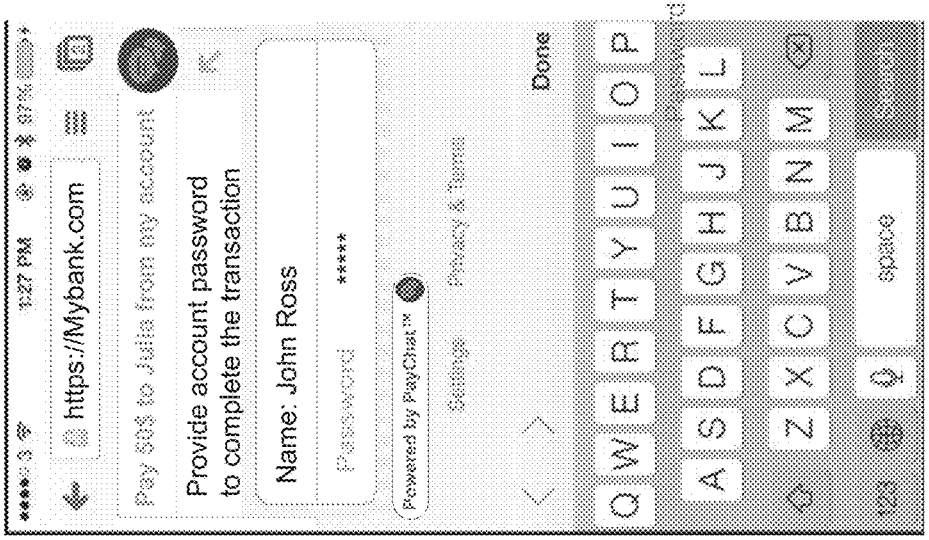
FIGS. 8A, 8B, 8C, 8D and 8E are screenshots and illustrations of an IM editor at the payer side and an IM editor at a payee side during an exemplary IM session and a screenshot of a token based authentication landing page, according to some embodiments of the present invention.
Figure 8B:
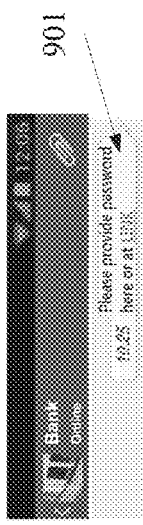
Figure 8C:
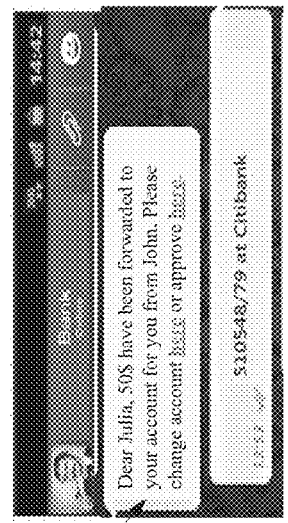
Figure 8D:
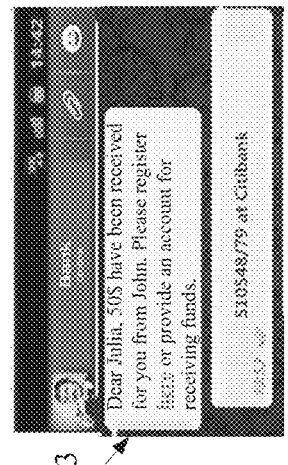
Figure 8A:
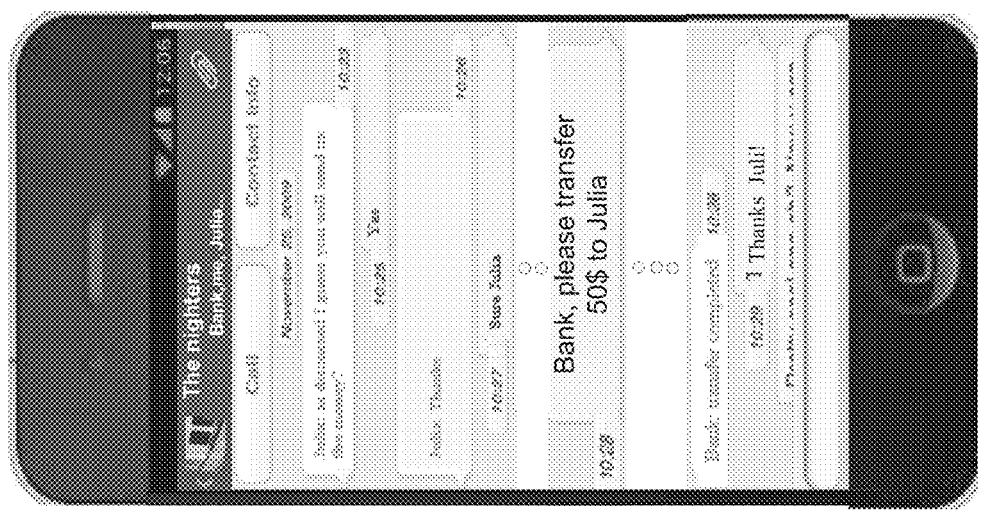
Figure 9:
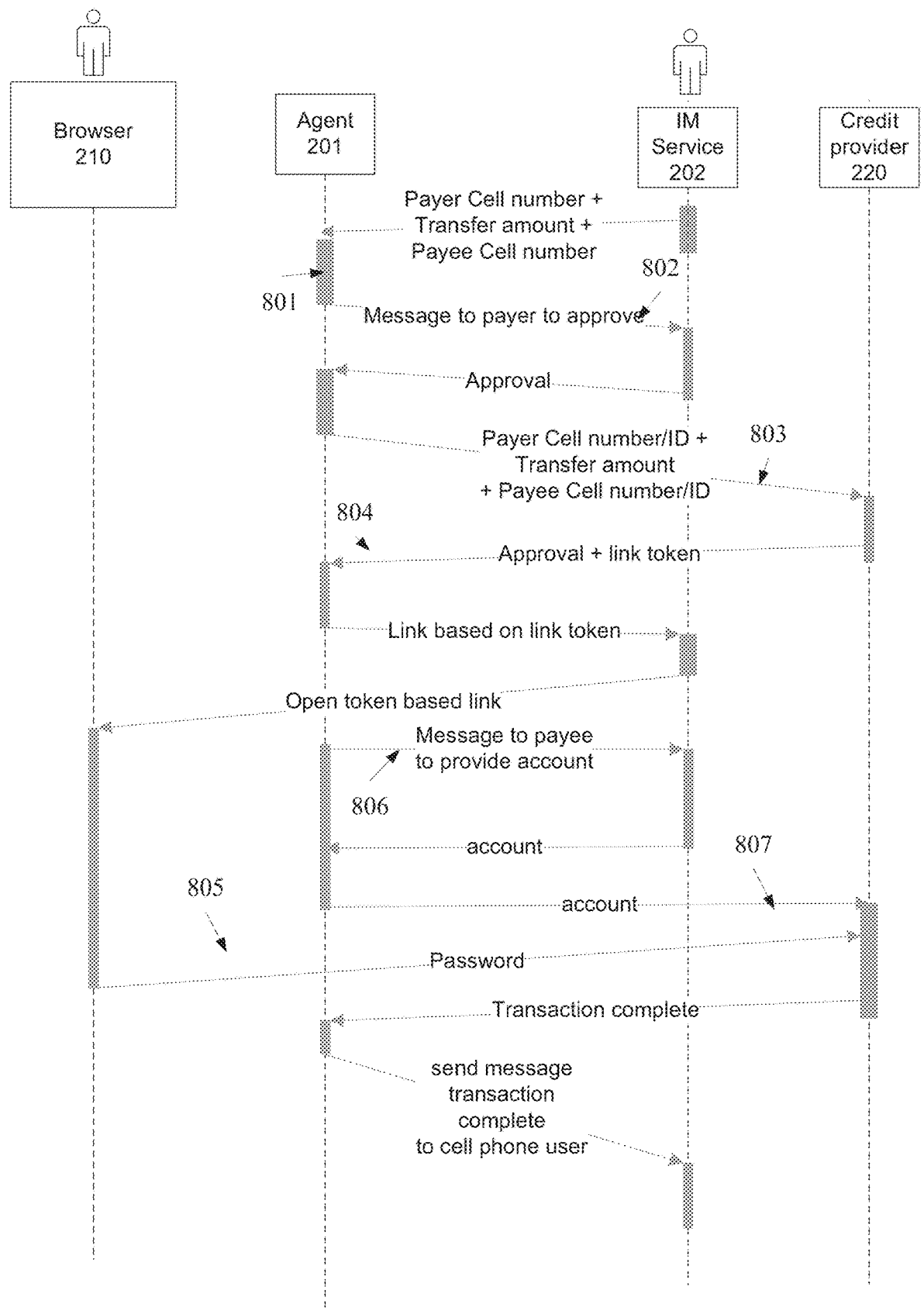
FIG. 9 is a sequence chart of data flow between a transaction system, an IM service, a browser application and a credit provider system during an exemplary IM session, according to some embodiments of the present invention.

Reference is now made to FIGS. 8A-8E, which are screenshots and illustrations of an IM editor at the payer side and an IM editor at a payee side during an exemplary IM session and a browser rendering an authentication landing page browsed by a token based link, according to some embodiments of the present invention. It should be noted that hereinbelow reference to agent 201 may be interoperated also as reference to agent 301. Reference is also made to FIG. 9, which is a sequence chart of data flow between a transaction system 200, the IM service 202, a browser application running on the client terminal 210 and the credit provider system 220 during the exemplary IM session, according to some embodiments of the present invention. The process depicted by FIGS. 8A-8E and FIG. 9 allows the credit provider system 220 to provide a token, for example a single use time dependent token, for authenticating an IM session and/or a password during the exemplary IM session. The token allows the credit provider system 220 to create a webpage which is designated for a transaction defined in the exemplary IM session and linked by a link created with the token in such a manner, the created webpage may include detail about the transaction and/or the payer and/or the beneficiary (e.g. payee) in advance. Moreover, the link may be to a server if the credit provider system 220. In such a manner, the user knows that his credentials, for example his password, are directly provided to the credit provider system 220 and not via the agent 201/301 and/or the IM system 202. The token may be a link, a portion of a link, or any instructions to generate a link. The link may be any web reference such as a Uniform Resource Locator (URL) and a Universal Resource Identifier (URI).

First, as shown at 801, message(s) inputted using the IM editor running on the client 210 to the IM service 202 is intercepted using the transaction performing entity agent 201. The messages are optionally addressed to the agent which was added to the IM session, for instance by the payer, for example as described above.

Transaction details and information about the payee (and about the payer when not known) are extracted from the message(s). As shown at 802, optionally, a transaction approval message is formulated and forwarded by the transaction performing entity agent 201 to the payer, for example as described above.

Now, as shown at 803, the transaction details and information about the payee and payee are forwarded to the credit provider system 220 via the network 205, optionally with a unique ID allocated for the transaction by the system 200.

This allows the credit provider system 220 to record the transaction request, verify the payer and/or payee details to generate a token, optionally single usage time dependent token. In parallel, the credit provider system 220 or a service controlled by it generates a payment approval webpage which is set to be browsed to by a token based link that includes the token or a portion thereof.

As shown at 804, the token is forwarded to the system 200 that generates a token based link accordingly. As shown in 901, the link is forwarded to the payer in an IM session with the credit provider, optionally separately from the payee. By activating the link a browser running on the client is instructed to browse automatically to the generated payment approval webpage. The generated payment approval webpage runs a GUI facilitating the payer to input a password and/or to select or adapt a payment method. As shown at 805, for example, FIG. 8E depicts such an exemplary landing page. Acquired password or any other credentials are forwarded to the credit provider system 220. Optionally, the browser rendering the landing page is minimized after the credentials are submitted, allowing the user to automatically proceed in the IM session using the IM editor without having to actively reload.

As shown at 806, optionally in parallel, the system 200 and the transaction performing entity agent 201 initiate an IM session to acquire an account or any other destination from the payee. For example, 902 is an exemplary IM message sent to a registered payee and 903 is an exemplary IM message sent to an unregistered payee. Registration to unregistered payee may be done via a designated webpage or website, for example as described above. As shown at 807, the account is forwarded to the credit provider system 220 by the system 200 and the transaction performing entity agent 201.

This allows the credit provider system 220 to complete the transaction, for example as described above.

By authenticating the credentials of the payer by using a webpage or a web service which is external to the IM service 202, the password of the payer is not exposed to the IM service or even to the transaction performing entity agent 201, allowing the payer to perform a transaction without exposing his credentials to any third party which is not the credit provider system 220. Moreover, the link token and/or the password may be forwarded using Secure Socket Layer (SSL) protocol where the webpage may be stored in a Secure Hypertext Transfer Protocol (HTTPS) host. The token may be generated using a random token generator.

The above example describes how a user action of adding an agent to an IM session, such as a group session allows the agent to participate in the IM session. According to some embodiments, the agent is added to an IM session established in response to another user action, for example using a camera of a client terminal running the IM module to scan a barcode or QR code or using a browser to access a GUI facilitating the user to input his cellular number or another peer cellular number for performing a transaction. These user actions signal the system 200 to instruct the agent 201 to establish the IM session with the action performing user. For instance, the QR reading triggers the sending of a message from the user with his ID or cellular number to the system. In another example, a user interface, for instance added to a web document such as a webpage using a Software Development (SDK) is used for sending a message to the system 200 to instruct the agent 201 to establish the IM session with the action performing user.

Figure 10:
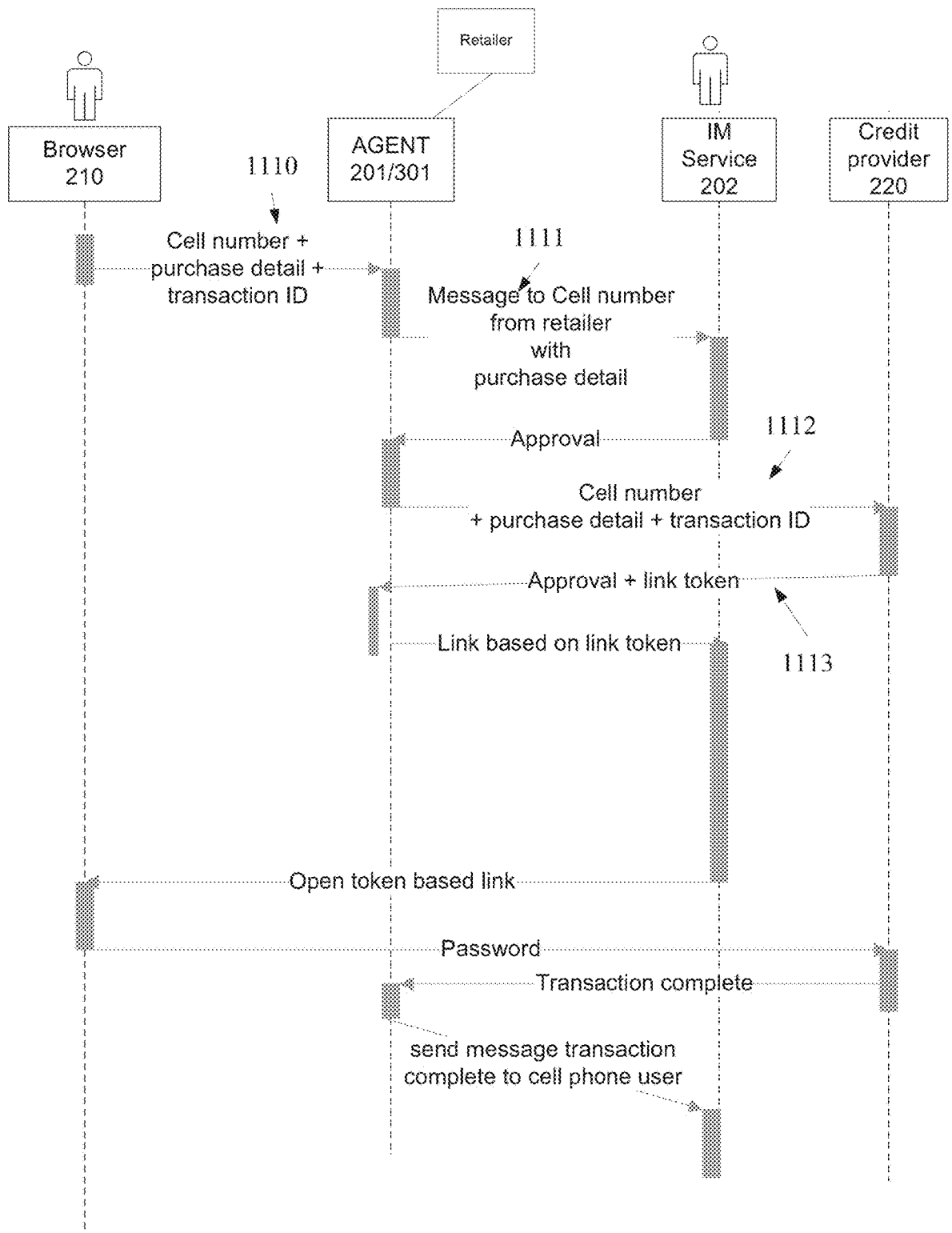
FIG. 10 is a sequence chart of data flow between a transaction system, an IM service, a browser application and a credit provider system during an exemplary IM session initiated by the transaction system in response to a user request or barcode reading, according to some embodiments of the present invention.

Reference is now made to FIG. 10, which is a sequence chart of data flow between the transaction performing entity agent 201 of the transaction system 200, the IM service 202, a browser hosted in the client 210 and the credit provider system 220 during an exemplary IM session initiated by the transaction system in response to a user request in a webpage or a barcode reading, for example a scanning of a quick response (QR) code, according to some embodiments of the present invention.

Figure 11A:
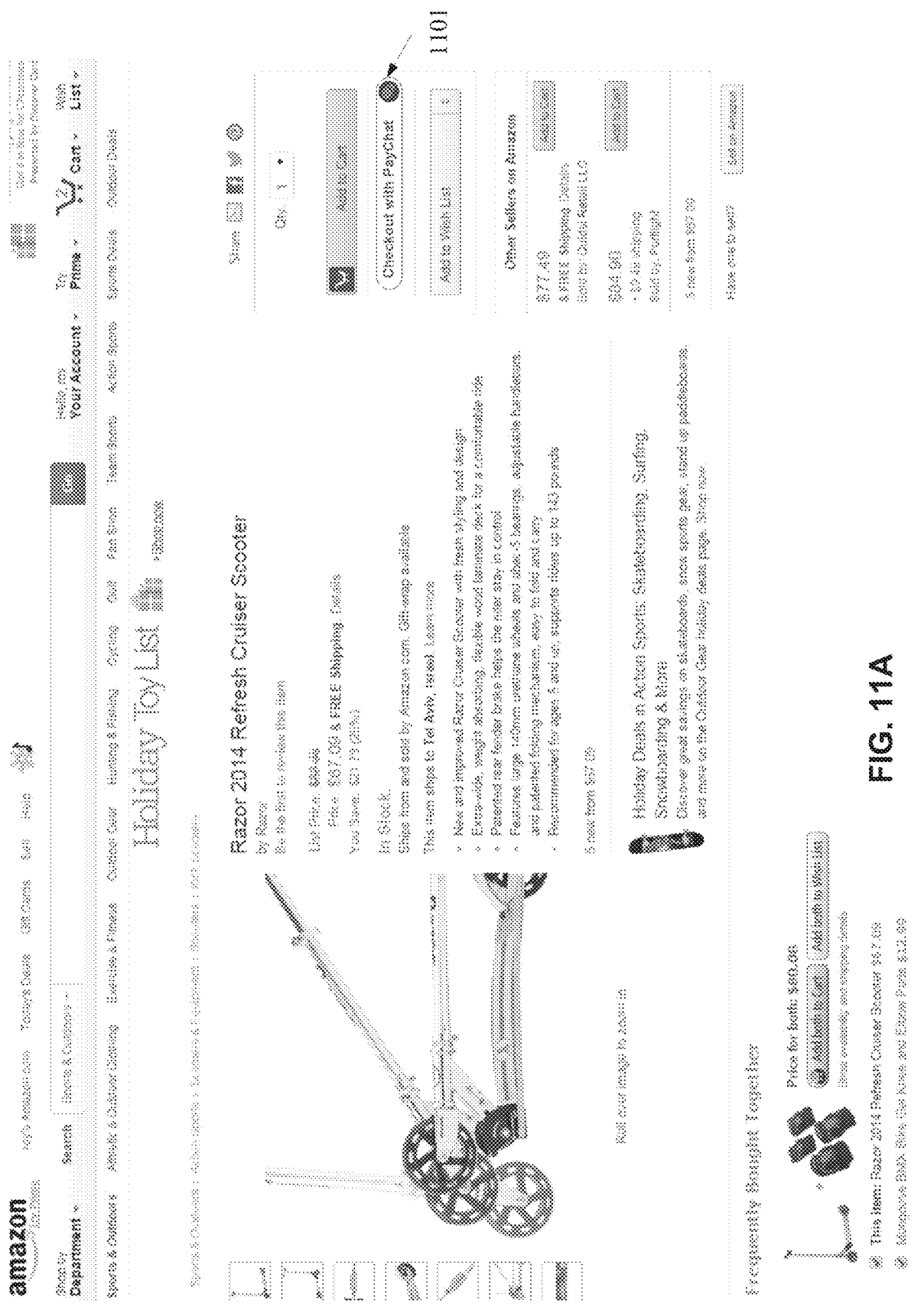
Figure 11B:

As described above, IM transaction session may be induced by the transaction performing entity agent 201 in response to a request received from a user. Optionally, the user submits a request for an IM transaction session, together with his cellular number, optionally in a webpage of a retailer. For example, FIGS. 11A and 11B are screenshots of a webpage rendered using a browser and including a checkout page enhanced with a web service button 1101 facilitating checkout by an exemplary IM session initiated by the transaction system 200, according to some embodiments of the present invention. In use, the user presses the button 1101 and in response a window 1102 is opened. The window may allow the user add contact(s) to the chat, adding them to the IM session so as to allow her to consult with them and to present them information about the price. Moreover, a group purchase of a product or a service promoted in a webpage from which the IM session was triggered (e.g. group purchase for the user and loaded contacts) may be managed by the transaction performing entity agent 201. In such an embodiment, the agent may be the managing messaging agent 301, a retailer agent (e.g. Amazon agent) that may also function as the transaction performing entity transaction performing entity agent 201, for instance as described above or a pair of agents, one of the retailer and another of the transaction performing entity agent.

Figure 12:
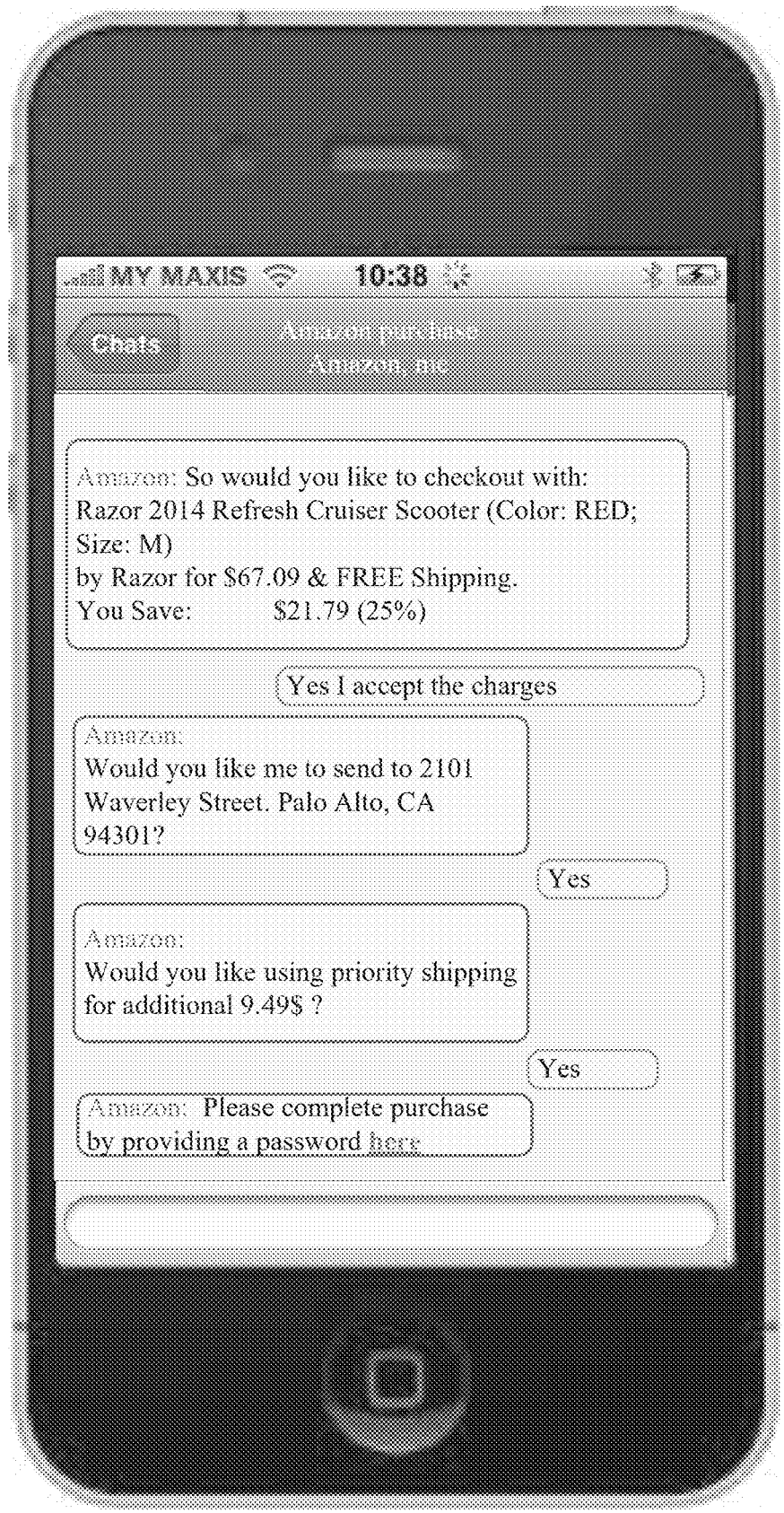
FIG. 12 is a screenshot of an IM editor at a client side during an exemplary IM session initiated in response to a web service user input, according to some embodiments of the present invention.

As shown at 1110, a web service associated with the pressed button forwards the inputted cell number, together with information about a service or a product in the webpage, to the system 200. The information may be extracted from a designated metadata, queried by the web service, copied from designated field, loaded by a service at the client side or at a server or a proxy side and/or the like. The number is optionally manually provided or confirmed by the user. The system starts a session with the user, using the loaded number, for example see FIG. 12 which is a screenshot of an IM editor at a client side during such an exemplary IM session initiated in response to a web service user input, according to some embodiments of the present invention. Optionally, the agent 201/301 submits a message which requests for a delivery terms, for example preferred address and/or delivery service level. Optionally, the delivery terms, for example the address are automatically extracted from the client record at the retailer, for instance by allowing the agent to query customer relationship management (CRM) and/or Enterprise Resource Planning (ERP) databases of the retailer. The agent 201/301 optionally provides a link to an authentication webpage, for example as depicted in FIG. 8E. Optionally, the agent 201/301 submits promotions to services or products which are related to the transaction, either according to instructions received from the retailer or by analyzing the purchase detail. This may be used to change the purchase detail, for instance by adding products or services and/or by adding coupon number(s) and/or the like. Credentials may be acquired as described above, for instance with reference to FIGS. 8A-8E. IT should be noted that the web service button 1101 may be added in various stages of a checkout process, allowing the user to complete checkout from a product or service page, from a cart page and/or from a payment page.

As shown at 1111, a deal information approval may be requested from the user. As shown at 1112, an indication about the selected product or service is forwarded to the credit provider system 220, for instance in a computer network message. When approved, the credit provider system 220 may respond with a token for facilitating a token based link for example as described above and depicted in 1113. Transaction completion may be based on acquisition and communication of a password as described above with reference to 804.

Figure 13B:
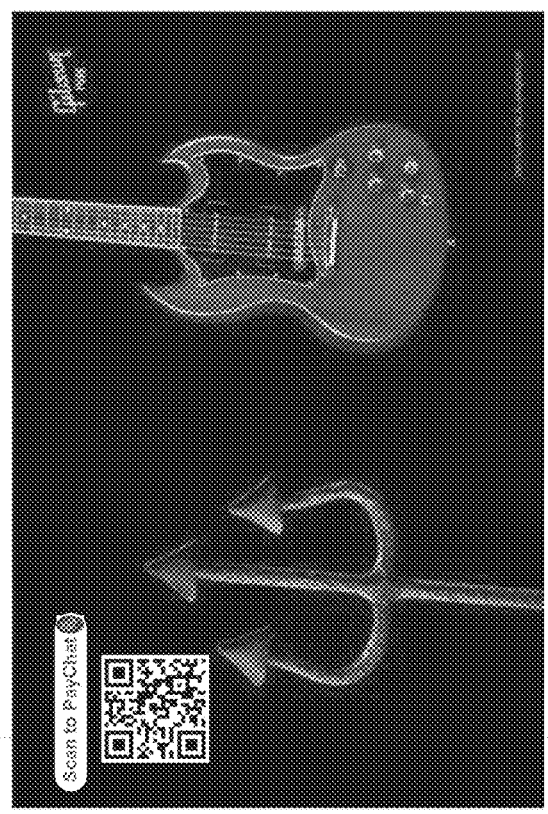
FIGS. 13A and 13B are schematic illustrations of printed media with QR codes for scanning by a client to trigger an initiation of an exemplary IM session, according to some embodiments of the present invention.
Figure 13A:
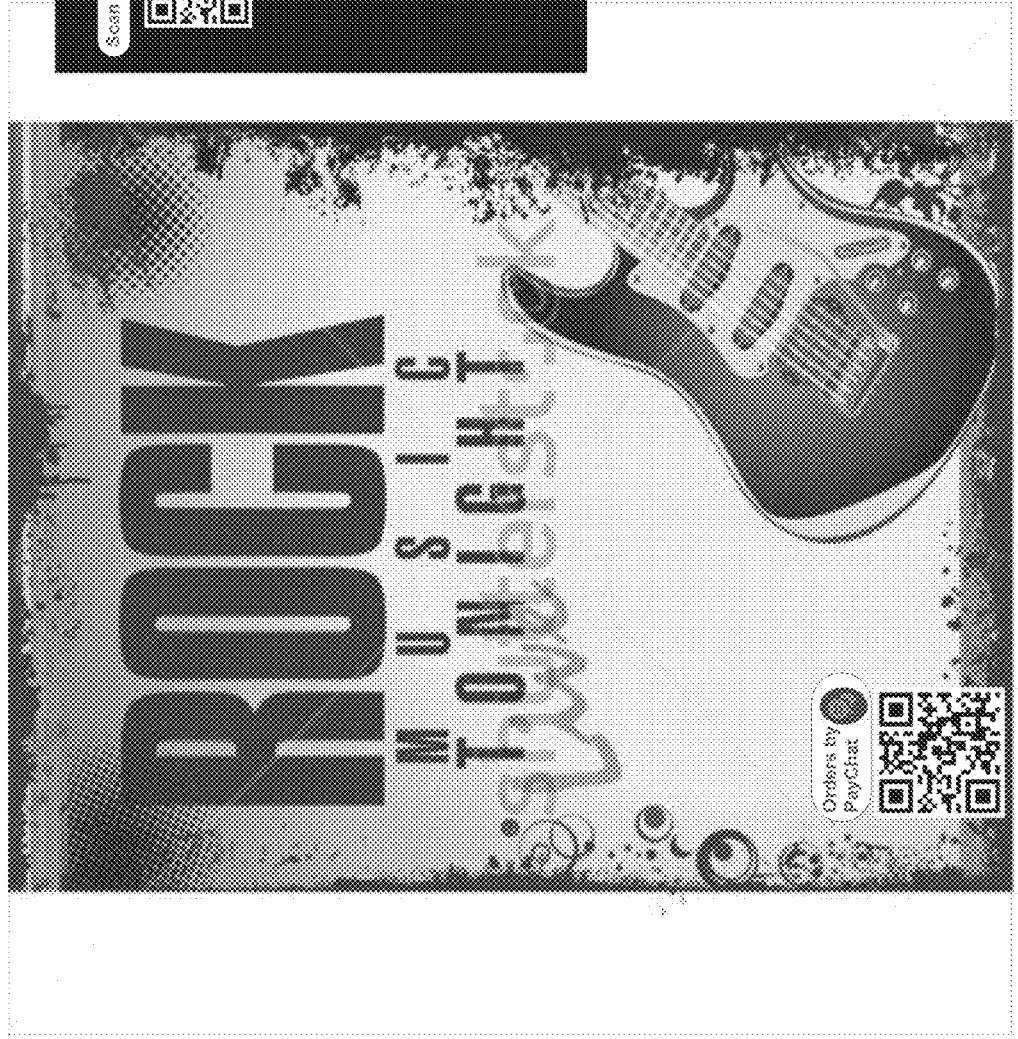
Figure 14:
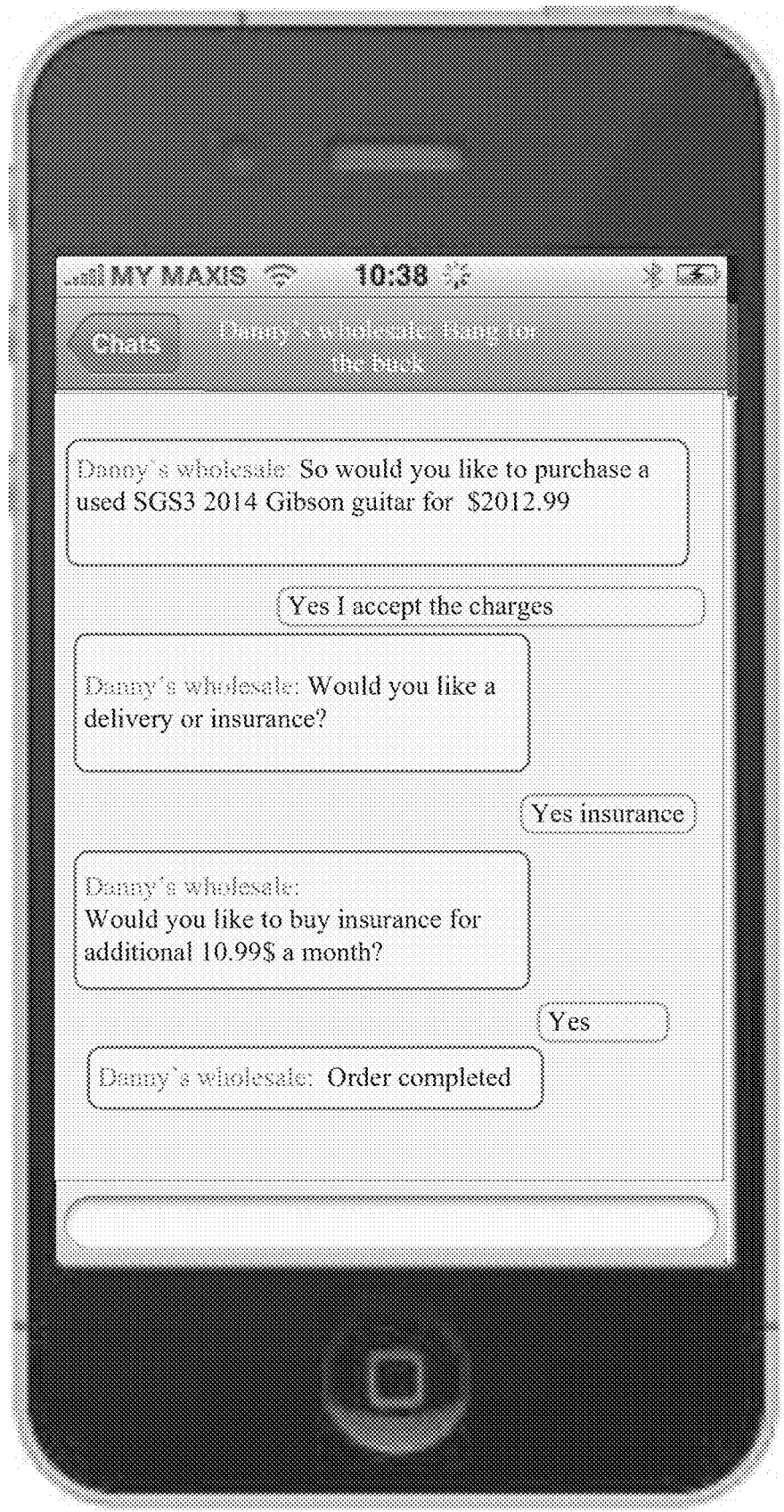
FIG. 14 is a screenshot of an IM editor at a client side during an exemplary IM session initiated in response to a QR scanning by a user, according to some embodiments of the present invention.

In some embodiments of the present invention, an IM session with the agent 201, the managing messaging agent 301, or a combination thereof is triggered in response to a QR code reading. In such embodiments, the client may be used as a QR scanner, set to forward information about a product or a service associated with the QR code, together with a number or ID of the scanning user, to the system. For example, FIGS. 13A and 13B are schematic illustrations of printed media with QR codes for scanning by a client to trigger an initiation of an exemplary IM session, according to some embodiments of the present invention, In use, the user can use a scanner application running on his client to scan a QR code associated with a product or a service in order to induce an IM session for payment. For example, the QR of FIG. 13A may be scanned for purchasing concert tickets and the QR of FIG. 13B may be scanned for purchasing a guitar. Reading the QR may be indicative of a certain product, as in the IM session depicted in FIG. 14 or indicative of a certain retailer, for example a QR located on his or her desk or shop window.

Optionally the QR is placed in a shop window, allowing a bypass user to purchase a product which is presented in the shop window without entering the shop, simply by scanning a QR which is placed in proximity to a presented product. In such embodiments the product may be delivered to the user. It should be noted that in such cases, the agent 201/301 may present promotions to the user and/or assist him with questions related to the product, for instance by using an NLP engine.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a message, a system, and a network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method comprising:
receiving, at a server device having a processor, a payment message from a first client device associated with a sender, the payment message defining a payment from the sender to a recipient;
generating, at the server device, a transaction identifier associated with payment information for the payment and comprising a sender identifier, a recipient identifier, and a payment amount;
initiating a transaction to process the payment from the sender to the recipient, wherein initiating the transaction comprises sending, from the server device, a payment authorization request associated with the transaction identifier to a payment provider server;
providing, by the server device to a second client device associated with the recipient, a recipient status message for display within a message thread on the second client device, the recipient status message comprising recipient transaction information corresponding to the payment;
providing, by the server device to the first client device, a sender status message for display within a message thread on the first client device, the sender status message comprising sender transaction information comprising a payment amount and a transaction status;
identifying, using the processor of the server device, a status of a transaction by which the payment from the sender to the recipient is processed by detecting a payment authorization response from the payment provider server; and
based on identifying the status of the transaction:
using the processor of the server device for sending instructions to update a display of the message thread on the first client device to present a status message including transaction status content; and
using the processor of the server device for sending instructions to the second client device to update the message thread of the second client device to include a selectable option to accept the payment from the sender;
wherein said message thread is of a discussion between said sender, a computerized agent, and the recipient; wherein the computerized agent is part of an IM session for analyzing the message thread.

2. The method of claim 1, further comprising:
receiving, from the second client device, an indication of the recipient having selected the selectable option to accept the payment; and
sending, to the payment provider server, an authorization request that causes the payment amount to be debited from a sender account and credited to a recipient account.

3. The method of claim 1, wherein said message thread is managed in an instant messaging (IM) service to which the sender and the recipient are registered using a telephone number; wherein the recipient is added to the message thread by selecting a contact from a contact list in response to a user action of said sender using the first client device.

4. The method of claim 3, wherein said user action comprises establishing a group session between said sender, the recipient and at least one additional participant.

5. The method of claim 1, further comprising generating a link to a user interface that allows the sender to input credentials for performing the payment.

6. The method of claim 5, wherein the user interface is displayed on a screen using a web browser.

7. The method of claim 5, wherein the payment authorization response comprises a token acquired from the payment provider server; wherein the token is used for generating a link to a user interface presenting the transaction status content to the recipient.

8. The method of claim 1, wherein said payment message is generated in response to identification of instructions provided in a message thread on the first client device, the identification is performed by analyzing text content in the message thread on the first client device with natural language processing (NLP).

9. The method of claim 1, wherein the computerized agent is added to the IM session by the sender.

10. The method of claim 1, further comprising establishing an additional message thread with the sender to authenticate the payment.

11. The method of claim 1, wherein said payment is a split of a larger payment for a product sold by a retailer represented to the sender and the recipient; further comprising separately authenticating the split by message threads separately held with the sender and the recipient by a computerized agent.

12. A system comprising:
at least one processor; and
at least one non-transitory computer readable storage medium storing instructions thereon that, when executed by the at least one processor, cause the system to:
receive, at a server device having a processor, a payment message from a first client device associated with a sender, the payment message defining a payment from the sender to a recipient;
generate, at the server device, a transaction identifier associated with payment information for the payment and comprising a sender identifier, a recipient identifier, and a payment amount;
initiate a transaction to process the payment from the sender to the recipient, wherein initiating the transaction comprises sending, from the server device, a payment authorization request associated with the transaction identifier to a payment provider server;
provide, by the server device to a second client device associated with the recipient, a recipient status message for display within a message thread on the second client device, the recipient status message comprising recipient transaction information corresponding to the payment;
provide, by the server device to the first client device, a sender status message for display within a message thread on the first client device, the sender status message comprising sender transaction information comprising a payment amount and a transaction status;
identify, using the processor of the server device, a status of a transaction by which the payment from the sender to the recipient is processed by detecting a payment authorization response from the payment provider server; and
based on the status of the transaction:
send instructions to update a display of the message thread on the first client device to present a status message including transaction status content; and
send instructions to the second client device to update the message thread of the second client device to include a selectable option to accept the payment from the sender.

13. A computer program product comprising:
a non transitory computer readable storage medium having stored thereon:
program instructions for receiving, at a server device having a processor, a payment message from a first client device associated with a sender, the payment message defining a payment from the sender to a recipient;
program instructions for generating, at the server device, a transaction identifier associated with payment information for the payment and comprising a sender identifier, a recipient identifier, and a payment amount;
program instructions for initiating a transaction to process the payment from the sender to the recipient, wherein initiating the transaction comprises sending, from the server device, a payment authorization request associated with the transaction identifier to a payment provider server;
program instructions for providing, by the server device to a second client device associated with the recipient, a recipient status message for display within a message thread on the second client device, the recipient status message comprising recipient transaction information corresponding to the payment;
program instructions for providing, by the server device to the first client device, a sender status message for display within a message thread on the first client device, the sender status message comprising sender transaction information comprising a payment amount and a transaction status;
program instructions for identifying, using the processor of the server device, a status of a transaction by which the payment from the sender to the recipient is processed by detecting a payment authorization response from the payment provider server; and
program instructions for, based on identifying the status of the transaction:
using the processor of the server device for sending instructions to update a display of the message thread on the first client device to present a status message including transaction status content; and
using the processor of the server device for sending instructions to the second client device to update the message thread of the second client device to include a selectable option to accept the payment from the sender.

* * * * *